US012566103B2

(12) United States Patent
Ruiz et al.

(10) Patent No.: US 12,566,103 B2
(45) Date of Patent: Mar. 3, 2026

(54) IMAGING SYSTEMS, INCLUDING IMAGING SYSTEMS FOR AR/VR DEVICES, AND ASSOCIATED SYSTEMS, DEVICES, AND METHODS

(71) Applicant: Radiant Vision Systems, LLC, Redmond, WA (US)

(72) Inventors: Javier Antonio Ruiz, Oceanside, CA (US); Eric Christopher Eisenberg, Bothell, WA (US); Alex Kwok Fung Ho, Renton, WA (US)

(73) Assignee: RADIANT VISION SYSTEMS, LLC, Redmond, WA (US)

( * ) Notice: Subject to any disclaimer, the term of this patent is extended or adjusted under 35 U.S.C. 154(b) by 0 days.

(21) Appl. No.: 18/282,492

(22) PCT Filed: Mar. 21, 2022

(86) PCT No.: PCT/US2022/021145
§ 371 (c)(1),
(2) Date: Sep. 15, 2023

(87) PCT Pub. No.: WO2022/204029
PCT Pub. Date: Sep. 29, 2022

(65) Prior Publication Data
US 2024/0159620 A1      May 16, 2024

Related U.S. Application Data

(60) Provisional application No. 63/164,918, filed on Mar. 23, 2021.

(51) Int. Cl.
*G01M 11/02* (2006.01)
*H04N 23/90* (2023.01)

(52) U.S. Cl.
CPC ........ *G01M 11/0207* (2013.01); *H04N 23/90* (2023.01)

(58) Field of Classification Search
CPC .... G01J 3/0208; G01J 3/506; G02B 13/0065; G02B 23/08; G02B 27/0172;
(Continued)

(56) References Cited

U.S. PATENT DOCUMENTS 10,075,685 B1 *  9/2018  Fulghum .............. H04N 9/3191
10,257,509 B2     4/2019  Austin et al.
(Continued)

FOREIGN PATENT DOCUMENTS

JP         2003029166 A       1/2003

OTHER PUBLICATIONS

Gamma Scientific. "NED AR/VR Testing Solutions." Jan. 23, 2023, 4 pages.
(Continued)

*Primary Examiner* — Masum Billah
(74) *Attorney, Agent, or Firm* — Perkins Coie LLP

(57)        ABSTRACT
Imaging systems, including imaging systems for AR/VR devices, and associated systems, devices, and methods are described herein. In one embodiment, an imaging system includes a lens arrangement operably connected to a camera. The lens arrangement can include a macro lens removably connected to an eyepiece with the macro lens positioned between the eyepiece and the camera. The eyepiece can be positioned at a distalmost end portion of the lens arrangement and/or such that an afocal side of the eyepiece is directed away from the macro lens. The lens arrangement can include a baffle removably connected to the macro lens and/or removably connected to the eyepiece. The macro lens can be electronically and/or automatically focused. A length of the lens arrangement and/or a position of the eyepiece can
(Continued)

remain unchanged while the macro lens is focused. In some embodiments, the lens arrangement has a folded configuration and/or includes a minor.

22 Claims, 6 Drawing Sheets

(58) Field of Classification Search
CPC .............. G02B 23/145; G02B 23/2423; G02B 23/2484; G02B 27/017; G02B 25/001; G02B 2027/014; G02B 2027/0138; G02B 2027/0178; G02B 5/04; G02B 27/0093; G02B 27/0176
USPC ......................................................... 348/135
See application file for complete search history.

(56) References Cited

U.S. PATENT DOCUMENTS

| | | | | |
|---|---|---|---|---|
| 10,509,213 B1 * | 12/2019 | Monari | ................ | G02B 15/163 |
| 10,921,721 B1 | 2/2021 | Fu et al. | | |
| 10,972,721 B2 | 4/2021 | Austin et al. | | |
| 11,181,606 B1 * | 11/2021 | Rowe | ................... | G02B 23/105 |
| 11,619,582 B2 | 4/2023 | Nelson et al. | | |
| 2008/0198258 A1 | 8/2008 | Ito | | |
| 2016/0295112 A1 | 10/2016 | Georgiev et al. | | |
| 2019/0191151 A1 | 6/2019 | Austin et al. | | |

OTHER PUBLICATIONS

Gamma Scientific. "NED W-Series." 2023, 3 pages.
Instrument Systems. "AR/VR Display Testing." 4 pages. Retrieved online on Oct. 4, 2023 at <https://www.instrumentsystems.com/en/systems/lumitop-ar-vr-display-testing>.
OptoFidelity. "OptoFidelity HMD IQ." 2021, 2 pages.
OptoFidelity. "OptoFidelity Buddy." Dec. 2022, 4 pages.
Schuster, N. et al., "Advanced Optics for the Evaluation of Near-To-Eye Displays." Information Display, May 2019, 8 pages.
Sensing "Optical Measurement Solutions." Sensing Optronics Co., Ltd. 2017, 10 pages.
Sensing. "VDM-1800. VR/AR Optical Measurement." Sensing Optronics Co., Ltd., 2021, 2 pages.
TechnoTeam. "LMK Display." 2018, 2 pages.
TechnoTeam. "NED (AR/VR/MR) Lenses." Retrieved online on Jan. 23, 2024 at <https://www.technoteam.de/products/lenses/ned_ar_vr_mr_lenses/index_eng.html>.
International Search Report and Written Opinion mailed Aug. 19, 2022 in International Patent Application No. PCT/US22/21145, 15 pages.
Radiant Vision Systems. AR/VR Lens. Retrieved from the internet on Mar. 21, 2022 at <https://www.radiantvisionsystems.com/products/imaging-colorimeters-photometers/ar/vr-lens>, 5 pages.
Radiant Vision Systems. ProMetric Y Imaging Photometers. Retrieved online on Mar. 21, 2022 at <https://www.radiantvisionsystems.com/products/imaging-colorimeters-photometers/prometric-y-imaging-photometers>, 4 pages.
Extended European Search Report mailed Jan. 8, 2025 for European Patent Application No. 22776395.0, 9 pages.
Notice of Preliminary Rejection mailed Sep. 12, 2025 in Korean Patent Application No. 10-2023-7035721, 14 pages, English Translation.

* cited by examiner

IMAGING SYSTEMS, INCLUDING IMAGING SYSTEMS FOR AR/VR DEVICES, AND ASSOCIATED SYSTEMS, DEVICES, AND METHODS

CROSS-REFERENCE TO RELATED APPLICATIONS

This application is a National Phase of International Patent Application No. PCT/US22/21145, filed Mar. 21, 2022, which claims the benefit of U.S. Provisional Patent Application No. 63/164,918, filed Mar. 23, 2021, both of which are incorporated by reference herein in their entireties.

TECHNICAL FIELD

The present disclosure relates generally to imaging systems. For example, some embodiments of the present technology relate to imaging systems for measuring augmented reality (AR) and/or virtual reality (VR) near-to-eye devices.

BACKGROUND

Electronic visual displays ("displays") have become commonplace. Displays are used in a wide variety of contexts, from scoreboards and billboards, to computer screens and televisions, to personal electronics. One such context is in AR and VR devices in which smaller displays are positioned near a user's eyes and are used to enhance the real-world environment by computer-generated perceptual information (in the case of augmented reality) or to completely replace the real-world environment with a simulated one (in the case of virtual reality).

It is often desirable to measure characteristics of some or all portions of a display. For example, it is often desirable to measure the color and brightness of a pixel or group of pixels in a display to ensure that the display meets specified and/or acceptable parameters before it is incorporated into other devices, shipped, and/or sold. In industry, imaging systems are often employed in addition to, or in lieu of, human vision to inspect displays. Data collected by such imaging systems can be used to verify that one or more characteristics (e.g., color and brightness) of a display are correct, to perform various calibrations to bring the characteristics of the display into alignment with specified and/or acceptable parameters, and/or to reject the display altogether such that the display is not provided to an end user.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments shown, but are provided for explanation and understanding.

DETAILED DESCRIPTION

A. Overview

Figures 1A, 1B:
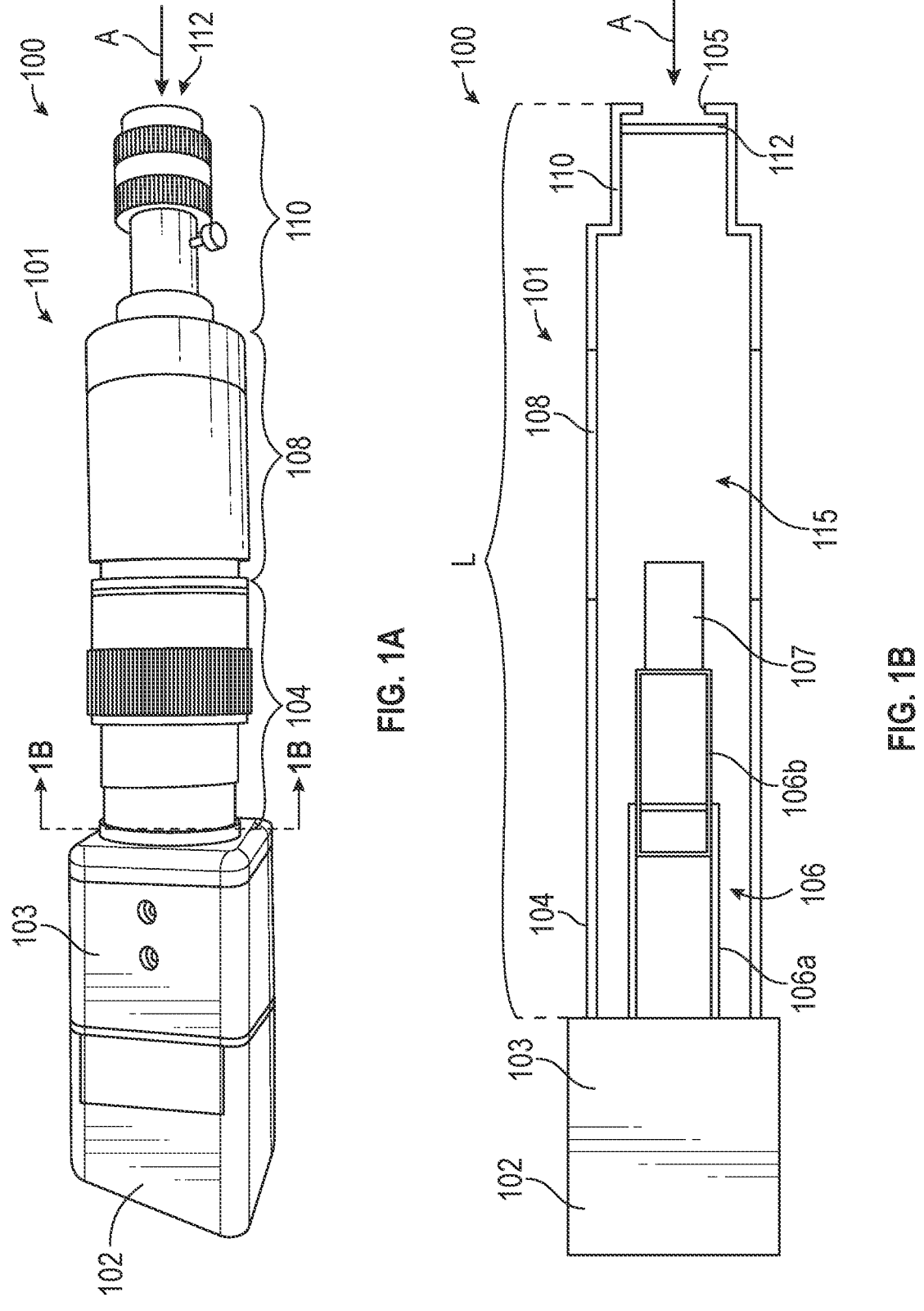
FIG. 1A is a side view of an imaging system configured in accordance with various embodiments of the present technology.
FIG. 1B is a schematic, partial cross-sectional side view of the imaging system of FIG. 1A.

The following disclosure describes imaging systems and associated devices, systems, and methods. For the sake of clarity and understanding, embodiments of the present technology are discussed in detail below with respect to imaging systems configured to measure (e.g., image) one or more displays of near-to-eye devices, such as AR and VR devices. The displays are occasionally referred to herein as devices under test (DUTs). A person of ordinary skill in the art will readily appreciate, however, that imaging systems (and associated systems, devices, and methods) of the present technology can be employed in other contexts, including to measure other DUTs. For example, imaging systems of the present technology can be employed to measure other displays, such as scoreboards, billboards, computer screens, televisions, and/or personal electronics. Additionally, or alternatively, imaging systems of the present technology can be employed to measure other components of a device besides its display (e.g., the cover or case of a mobile phone to, for example, identify cosmetic defects; an illuminator, such as an infrared illuminator on a facial recognition device; diffraction gratings; diffractive optical elements; holographic optical elements) and/or to measure other objects that may lack displays altogether (e.g., appliance parts, vehicle parts, durable good surfaces, etc.). Such other applications are within the scope of the present technology.

As discussed above, it is often desirable to measure characteristics (e.g., color and/or brightness) of some portion of a DUT to increase the likelihood that the DUT meets specified and/or acceptable parameters before it is incorporated into other devices, shipped, and/or sold. In industry, imaging systems are often employed to perform such measurements. But use of imaging systems to perform measurements on displays of near-to-eye devices presents several challenges. For example, many near-to-eye devices include a display intended for placement within a few millimeters or centimeters from a user's eye. Many imaging systems, however, have an entrance pupil that is buried inside the lens housing. Thus, an exit pupil of the DUT (which is typically positioned 10 to 20 mm from the DUT in most AR/VR devices to allow for eye relief of the human observer) will not be coincident with the entrance pupils of these imaging systems, which can cause the fields of view (FOY) of these imaging systems to be clipped when looking through the exit pupil of the DUT. As a result, imaging systems with buried entrance pupils are unable to achieve their designed field of view when inspecting the DUT.

Additionally, imaging systems that have a buried entrance pupil can exhibit significant distortion of the entrance pupil.

This is particularly true of wide FOV imaging systems and is primarily due to the optical elements between the front and the aperture stop of the imaging system. A distorted entrance pupil does not mimic the pupil of the human eye, which is circular and has no depth along the optical axis. In contrast to these imaging systems, imaging systems configured in accordance with the present technology do not include optical elements inserted between the front and the aperture stop of the imaging system. Thus, the aperture stop of the imaging system is coincident with the entrance pupil of the imaging system, and the aperture stop and the entrance pupil are always located beyond the front of the imaging system. This allows the exit pupil of the DUT, which is also positioned outside of the DUT, to be made coincident with entrance pupil of the imaging system.

Furthermore, lenses with entrance pupils that are not buried inside the lens housing are often bulky in size. This makes it difficult to use such lenses to measure displays of near-to-eye devices because the displays are often incorporated into other device components. For example, virtual reality goggles often have displays incorporated into a headset having a headband designed to fit an average adult head. The headset and headband limit the amount of space available in front of and/or surrounding a display within which to position an imaging system and/or a lens for measuring the display.

In addition, many imaging systems are manually-focused systems. Often, this means that a lens barrel of an imaging system is translated to reposition a lens until it is in focus on a DUT. As the lens barrel is translated, the length of the lens barrel changes, which in turn changes the position of the entrance pupil of the imaging system. Thus, when a DUT is a display of a near-to-eye device, the imaging system must often be repositioned whenever the lens barrel is translated such that the entrance pupil is repositioned to the location that a human eye would be positioned when the near-to-eye device is used by a human as intended.

Moreover, there are a wide variety of near-to-eye devices, each having a display requiring an imaging system with specific parameters (e.g., a specific angular FOV, focus range, imaging quality, form factor, etc.) for capturing desired and/or accurate measurements of the display. Thus, imaging systems are often custom designed with specific parameters for a particular near-to-eye device such that the imaging systems are suitable for measuring one or more displays of that particular near-to-eye device. The custom design process is a time-intensive (e.g., on the order of months or years) and cost-intensive process of research, development, sourcing, and/or testing. And once a custom-designed imaging system is successfully assembled, its parameters (e.g., its angular FOV, imaging quality, form factor, etc.) cannot be readily modified (e.g., adjusted, adapted, etc.) to make the custom-designed imaging systems suitable for taking measurements of a different near-to-eye device.

As a specific example, a display in a VR near-to-eye device might be configured to immerse a user by filling as much of the user's FOV as possible. In contrast, a display in an AR near-to-eye device might be configured to present information in only a small portion of the user's FOV. Thus, a custom-designed imaging system for measuring the display of the AR near-to-eye device might have a small angular FOV (e.g., ±20 degrees). But the small angular FOV of the custom-designed imaging system cannot be readily enlarged (e.g., to ±60 degrees) such that the custom-designed imaging system can capture (in a single image) all of the information presented by the display of the VR near-toeye device. This may be because a camera and/or a lens arrangement of the custom-designed imaging system is developed and assembled as a unitary piece of equipment. Thus, access to the components of the camera and/or lens arrangement can be difficult, and the components cannot be easily swapped for other components with different parameters. Therefore, an entirely new imaging system must be custom designed for measuring the display of the VR near-to-eye device, meaning that the time- and cost-intensive process of research, development, sourcing, and/or testing must be repeated to assemble a new custom-designed imaging system from entirely separate optical components.

To address these challenges, the inventors have developed imaging systems that include a camera (having an image sensor) and a lens arrangement. The lens arrangement can include a macro lens, a baffle, an aperture, and an eyepiece. In some embodiments, the eyepiece can be positioned at or near a distalmost end portion of the lens arrangement and/or of the imaging system. An exit pupil of the eyepiece can be the entrance pupil of the imaging system. (Thus, unless otherwise made clear by context, the term "exit pupil of the eyepiece" can refer to an "entrance pupil of the imaging system" (and vice versa) throughout the detailed description that follows.) To ensure that the exit pupil of the eyepiece is the entrance pupil of the imaging system, the f-stop of the macro lens can be set to its wide-open or smallest f/# position. The macro lens can be designed and/or chosen such that its smallest f/# is smaller than the effective f/# of the eyepiece. Additionally, the measurement can be performed at a smaller pupil size than the effective pupil size of the eyepiece. To accomplish this, an optional aperture can be positioned at the entrance pupil of the imaging system. The position of the eyepiece at or near the distalmost end portion of the lens arrangement can facilitate quickly positioning the exit pupil of the eyepiece at a location corresponding to the location that a human eye pupil would be positioned when the near-to-eye device is used by a human as intended. Furthermore, because the eyepiece is positioned at or near the distalmost end portion of the lens arrangement and/or the imaging system, (i) the entrance pupil of the imaging system is not buried and (ii) the FOV of the imaging system will not be clipped when looking through the exit pupil of the DUT. Thus, the imaging system can realize the full FOV of the imaging system.

In operation, the macro lens can be focused onto an intermediate image plane close to the field stop position of the eyepiece. (The image formed at the intermediate image plane may be real or virtual depending on the type of eyepiece. For example, Nagler eyepieces will form a virtual image. For the purposes of the present technology, whether the intermediate image is real or virtual is of no consequence.) The field stop position of the eyepiece can be in effect a position of where the eyepiece is focused at infinity. Thus, when the macro lens is focused on the field stop position of the eyepiece, the entire imaging system can be focused on infinity. To focus the imaging system at a shorter working distance than infinity, the macro lens can be focused on an intermediate image plane located behind the field stop of the eyepiece. The imaging system in operation is focused on a virtual image formed by the DUT optics. The distance from the exit pupil of the DUT to the virtual image plane formed by the DUT optics can be anywhere between 250 mm to infinity, with 2000 to 5000 mm being the most common range.

In these and other embodiments, the macro lens can be electronically and/or automatically focused, and/or the macro lens can be focused while the length of the lens arrangement remains unchanged. Thus, in these embodiments, the position of the entrance pupil (e.g., the position of the eyepiece) of an imaging system can remain unchanged while the macro lens is focused, meaning that the focusing procedure of the macro lens does not necessitate repositioning the imaging system before measuring a DUT. Furthermore, the focusing procedure of the macro lens does not increase an overall length of the system. As such, the entrance pupil of imaging system can remain coincident with the exit pupil of the DUT independent of the focusing procedure of the macro lens.

In these and other embodiments, imaging systems and/or lens arrangements of the present technology can have a folded configuration. In such embodiments, the bulk of the imaging systems and/or lens arrangements can be positioned at locations other than directly in front of a DUT. This can be advantageous when measuring DUTs in which there is a limited amount of space in front of and/or surrounding a DUT within which to position an imaging system. For example, the folded configuration of imaging systems of the present technology can facilitate measuring DUTs by positioning only a small portion (e.g., the eyepiece and/or a mirror) directly in front of DUT.

In these and still other embodiments, imaging systems of the present technology can be modular. Stated another way, various components (e.g., a camera, an image sensor, a macro lens, a baffle, an eyepiece, an eyepiece mount, and/or an aperture) can be interchangeable with other components of similar kind. For example, the lens arrangement can be quickly disassembled into individual components (e.g., a macro lens, a baffle, a mirror, an eyepiece, and/or an aperture) and/or reassembled with different components in some embodiments. As a specific example, the eyepiece of an imaging system can be detached from the lens arrangement and swapped out for (e.g., replaced with) another eyepiece having different characteristics (e.g., a different diameter). The other eyepiece can be compatible with the various other components of the imaging system and/or the lens arrangement and/or can be quickly attached (e.g., installed) into the lens arrangement. As such, various parameters (e.g., angular FOV, focus range, imaging quality, form factor, etc.) of an imaging system can be quickly adjusted (e.g., adapted, altered, changed, etc.) by replacing one or more components of the imaging system with one or more other components that provide the imaging system a set of desired parameters. Thus, the interchangeability of components of an imaging system enables the imaging system (which may have been originally assembled for measuring a DUT of a first near-to-eye device) to be quickly modified (e.g., adapted, adjusted, changed, etc.) such that it is suitable for measuring a DUT of a second, different near-to-eye device.

In some embodiments, multiple imaging systems can be used to capture stereoscopic and/or simultaneous measurements (e.g., of one or more DUTs). For example, two imaging systems can be used to simultaneously measure two DUTs of a near-to-eye device. This can reduce the time required to inspect both of the DUTs of the near-to-eye device (e.g., especially in comparison to arrangements having a single imaging system), which can increase throughput of inspected near-to-eye devices.

Images captured by imaging systems of the present technology can be spatial or non-spatial. For example, an imaging system configured in accordance with some embodiments of the present technology can be a spatial imaging system that is used to capture still images or to record moving images. To capture a spatial image, a lens of the imaging system can focus light from a scene or source onto an image capture mechanism (e.g., a charge coupled device (CCD) image sensor or a complementary metal-oxide semiconductor (CMOS) image sensor), which can capture/record the color and brightness at multiple point within that image. Thus, such a spatial imaging system can capture spatial information (e.g., relative location, shape, size, and/or orientation data) of the scene or source and/or of objects within the scene or source.

As another example, an imaging system configured in accordance with other embodiments of the present technology can be a non-spatial imaging system that is used to capture data of a scene or source and/or objects within the scene or source that are independent of geometric considerations. The non-spatial imaging system can transform an image from the spatial regime into other regimes, such as Fourier space, angular space, spectral space, etc. As a specific example, the non-spatial imaging system can include a conoscope that is used to measure an angular distribution of particular wavelengths of light emitted by or from a scene or source. The source can be a small finite source (e.g., a light emitting diode (LED) or vertical cavity surface emitting laser (VCSEL)) within the imaging system's entrance pupil, or the source can be an extended source such as a display panel with an emitting area that extends outside of the imaging system's entrance pupil.

Certain details are set forth in the following description and in FIGS. 1A-6 to provide a thorough understanding of various embodiments of the present technology. However, other details describing well-known structures and systems often associated with imaging systems, product inspection, and/or machine vision systems and associated methods are not set forth below to avoid unnecessarily obscuring the description of various embodiments of the technology.

Many of the details, dimensions, angles, and other features shown in FIGS. 1A-6 are merely illustrative of particular embodiments of the technology. Accordingly, other embodiments can have other details, dimensions, angles, and features without departing from the spirit or scope of the present technology. In addition, those of ordinary skill in the art will appreciate that further embodiments of the technology can be practiced without several of the details described below.

B. Selected Embodiments of Imaging Systems,
Including Imaging Systems for AR/VR Devices,
and Associated Systems, Devices, and Methods 1. Imaging Systems and Associated Systems and Devices FIG. 1A is a side view of an imaging system 100 configured in accordance with various embodiments of the present technology, and FIG. 1B is a schematic, partial cross-sectional side view of the imaging system 100 of FIG. 1A taken along line 1B-1B in FIG. 1A. As shown in FIG. 1A, the imaging system 100 includes a lens arrangement 101 and a machine or camera 102. The camera 102 includes an image sensor 103. The lens arrangement 101 includes a macro lens 104 (only a housing or barrel of the macro lens 104 is visible in FIG. 1A), a baffle 108, and an eyepiece 112. The eyepiece 112 is positioned within an eyepiece housing, shroud, or mount 110. In some embodiments, the imaging system 100 can additionally include a mount that can be used to position and hold the imaging system 100 at a desired location and/or orientation.

The camera 102 and/or the image sensor 103 of the imaging system 100 can be any camera and/or image sensor suitable for imaging a device under test (DUT), such as one or more displays of a near-to-eye device. As a specific example, the camera 102 can be a ProMetric Y Series Photometer or a ProMetric I Series Colorimeter commercially available from Radiant Vision Systems, LLC of Redmond, Washington. In some embodiments, the camera 102 is a spatial measurement camera. In these and other embodiments, the camera 102 includes one or more color filter wheels (not shown). In these and still other embodiments, the camera 102 is a non-spatial measurement camera (e.g., for use with a conoscope lens). The image sensor 103 can be a CCD image sensor and/or a CMOS image sensor.

In some embodiments, the camera 102 and/or the image sensor 103 can be selected based on desired characteristics. For example, the camera 102 and/or the image sensor 103 can be selected based at least in part on desired sensor pixel resolution, sensor megapixels, sensor type, field of view, camera dynamic range, high dynamic range, luminance minimum or maximum, camera accuracy, sensor aspect ratio, sensor shape, sensor form factor, camera measurement capabilities (e.g., luminance, radiance, illuminance, irradiance, luminous intensity, radiant intensity, etc.), and/or on other desired characteristics. In these and other embodiments, the camera 102 and/or the image sensor 103 can be selected based at least in part on use of a particular macro lens 104 (e.g., based at least in part on hardware and/or software compatibility with the particular macro lens 104) and/or on other components of the imaging system 100. In these and still other embodiments, the camera 102 and/or the image sensor 103 can be selected based at least in part on characteristics of a DUT, such (a) a size of an area of interest on a display DUT and/or (b) space or size constraints presented by the DUT and/or another system (e.g., a headset) including the DUT.

The macro lens 104 can likewise be any macro lens suitable for imaging a DUT. As a specific example, the macro lens 104 in the embodiment illustrated in FIG. 1A is a macro lens, such as a Canon EF 100 mm f/2.8 L Macro IS USM lens commercially available from Canon U.S.A., Inc. of Melville, New York. In some embodiments, the macro lens 104 can be selected based on desired characteristics. For example, the macro lens 104 can be selected based at least in part on desired magnification, pupil size and/or location, focus distance, luminance minimum or maximum, horizontal or vertical field of view, size and/or barrel length, measurement capabilities (e.g., luminance, radiance, CIE chromaticity coordinates, correlated color temperature, etc.), and/or on other desired characteristics. In these and other embodiments, the macro lens 104 can be selected based at least in part on use of a particular camera 102 and/or image sensor 103 (e.g., based at least in part on hardware and/or software compatibility with the particular camera 102 and/or the particular image sensor 103) and/or on other components of the imaging system 100 (e.g., based at least in part on a length of a particular baffle 108 and/or on a focus length of a particular eyepiece 112). In these and still other embodiments, the macro lens 104 can be selected based at least in part on characteristics of a DUT, such as (a) size of an area of interest on a display DUT and/or (b) space or size constraints presented by the DUT and/or another system (e.g., a headset) including the DUT. As shown in FIG. 1A, the macro lens 104 can be removably and/or mechanically connected to the camera 102 and/or to the imaging sensor 103. In some embodiments, the macro lens 104 can additionally or alternatively be removably and/or electrically connected to the camera 102 and/or to the imaging sensor 103.

The eyepiece 112 can be an ocular lens that is commonly employed in various optical systems. For example, the eyepiece 112 can be an eyepiece commonly employed in telescopes, microscopes, binoculars, rifle scopes, and/or other optical systems. In some embodiments, the eyepiece 112 can be selected based at least in part on desired characteristics. For example, the eyepiece 112 can be selected based on desired field of view, focal length, diameter, shape, type (e.g., Galilean, Convex, Huygenian, Ramsden, Kellner, Orthoscopic, Plössl, Monocentric, Erfle, König, RKE, Nagler, etc.), and/or on other desired characteristics. In these and other embodiments, the eyepiece 112 can be selected based at least in part on use of a particular macro lens 104 (e.g., based at least in part on the focal length of the macro lens 104) and/or on other components of the imaging system 100 (e.g., based at least in part on a length of a particular baffle 108 and/or based at least in part on a length of a particular eyepiece mount 110). In these and still other embodiments, the eyepiece 112 can be selected based at least in part on characteristics of a DUT, such as (a) size of an area of interest on a display DUT and/or (b) space or size constraints presented by the DUT and/or another system (e.g., a headset) including the DUT.

As best shown in FIG. 1B, the eyepiece 112 is positioned at or near a distalmost end of the eyepiece mount 110, the lens arrangement 101, and/or the imaging system 100. For example, the eyepiece 112 can be positioned at the distalmost end of the eyepiece mount 110, the lens arrangement 101, and/or the imaging system 100. In other embodiments, the imaging system 101 can include an aperture 105 positioned in front of the eyepiece 112, as discussed in greater detail below. In these embodiments, the eyepiece 112 can be positioned near the distalmost end. As a result of the position of the eyepiece 112 at or near the distalmost end, an exit pupil of the eyepiece 112 and/or an entrance pupil of the imaging system 100 and is not buried in the eyepiece mount 110 and/or the lens arrangement 101 of the imaging system 100. In other words, the exit pupil of the eyepiece 112 and/or the entrance pupil of the imaging system 100 is positioned in front of the imaging system 100 and outside of the lens arrangement 101. Stated another way, the eyepiece 112 can be positioned such that a FOV of the imaging system 100 is not clipped (or is only minorly and/or insignificantly obstructed) when looking through an exit pupil of a DUT. Furthermore, the position of the eyepiece 112 at or near the distalmost end portion of the eyepiece mount 110 and/or the lens arrangement 101 facilitates quickly positioning an exit pupil of the eyepiece 112 at a location corresponding to a location that a human eye pupil would be positioned when the near-to-eye device is used by a human as intended. When the exit pupil of the eyepiece 112 is positioned at this location, the imaging system 100 can measure parameters (e.g., color, luminance, etc.) exactly and/or similar to how those parameters would be viewed by a human user when using the near-to-eye device as intended.

In the illustrated embodiment, the eyepiece 112 is positioned in the eyepiece mount 110 in an orientation reversed from and/or opposite to how the eyepiece 112 would be positioned in other common optical systems. For example, in a common optical system, an eyepiece is typically positioned as the last or nearly the last optical element through which light traverses before it reaches a user's eye. Thus, the eyepiece is typically positioned proximate (e.g., a distance corresponding to the eye relief of the eyepiece from) the user's eye. Furthermore, the eyepiece is configured to (i) take an intermediate image formed by one or more other optical elements of the common optical system and (ii)

present the image to the user's eye. To accomplish this, a focal side of the eyepiece is directed toward the intermediate image, and an afocal side of the eyepiece is directed toward the user's eye. The afocal side of the eyepiece is used to present the image to the user's eye as collimated light that (from the perspective of the user's eye) appears similar to light coming from infinity and therefore reduces strain on the user's eye.

In contrast, the eyepiece 112 of the present technology is positioned as the first or nearly the first optical element through which light traverses on its way through the lens arrangement 101 to the image sensor 103 of the camera 102. Thus, the eyepiece 112 is positioned at or near the front or distal end of the imaging system 100. In other words, the eyepiece 112 is positioned a large distance (e.g., a distance much greater than the eye relief of the eyepiece 112) from the image sensor 103. Furthermore, the eyepiece 112 is configured to (i) take a far field image of an object and (ii) present an intermediate image to the macro lens 104. To accomplish this, an afocal side of the eyepiece 112 is directed toward the far field image of the object, and a focal side of the eyepiece 112 is directed toward the macro lens 104.

Referring to FIGS. 1A and 1B together, the baffle 108 can be a generally hollow barrel that (e.g., removably) operably and/or mechanically connects the eyepiece mount 110 to a barrel of the macro lens 104. In some embodiments, the baffle 108 can be selected based at least in part on desired characteristics. For example, the baffle 108 can be selected based at least in part on desired length, diameter, shape (e.g., straight or folded), and/or on other desired characteristics. In these and other embodiments, the baffle 108 can be selected based at least in part on use of a particular macro lens 104 (e.g., based at least in part on the focal length of the macro lens 104) and/or on other components of the imaging system 100 (e.g., based at least in part on the focal length of a particular eyepiece 112). In these and still other embodiments, the eyepiece 112 can be selected based at least in part on characteristics of a DUT, such as space or size constraints presented by the DUT and/or another system (e.g., a headset) including the DUT.

In some embodiments, the baffle 108 shields an internal lens of the macro lens 104 from stray (e.g., ambient) light such that only light introduced into the imaging system 100 via the eyepiece 112 reaches the internal lens of the macro lens 104. In other embodiments, the imaging system 100 can lack a baffle 108 and/or the baffle 108 can be incorporated into other components of the imaging system 100. For example, the eyepiece mount 110 can be directly connected to the barrel of the macro lens 104 in some embodiments. In these embodiments, a portion of the eyepiece mount 110 and/or a portion of the barrel of the macro lens 104 can serve as the baffle 108.

Referring now to FIG. 1B, the imaging system 100 can optionally include an aperture 105 positioned in front of the eyepiece 112 (e.g., at or near a position of an eye relief of the eyepiece 112, and/or at or near the exit pupil of the eyepiece and/or the entrance pupil of the imaging system). The aperture 105 can be formed by an extension of the eyepiece mount 110 in some embodiments. In other embodiments, a separate component including or forming the aperture 105 can be attached to the eyepiece mount 110. The aperture 105 can have a fixed or adjustable shape and/or size (e.g., dimension). For example, the aperture 105 can be circular with a fixed or adjustable diameter. In embodiments in which the size of the shape and/or size of the aperture is/are adjustable, the shape and/or size of the aperture can be manually or electronically adjusted. If electronically adjustable, the component including or forming the aperture 105 can be electrically coupled to the eyepiece mount 110, the baffle 108, the macro lens 104, and/or camera 102. In operation, the aperture 105 can limit or adjust the amount of light that enters the lens arrangement 101, much like how a pupil of a human eye can limit or adjust (e.g., via dilation and/or contraction) the amount of light permitted into the human eye. In some embodiments, the imaging system 100 can include a virtual aperture (e.g., in lieu of the physical aperture 105) defined by the optics of the imaging system 100. For example, when imaging a DUT in an environment with mechanical constraints, a virtual aperture can be used to project the entrance pupil of the imaging system 100 in front of the lens arrangement 101.

The macro lens 104 can include one or more internal components. For example, the macro lens 104 can include a lens tube 106 and a lens 107. As shown, the lens tube 106 includes a first stationary component 106a and a second movable component 106b. The lens 107 can be fixedly attached to the second component 106b, and/or the second component 106b can move into and out of the first component 106a (e.g., along an axis generally parallel to the arrow A illustrated in FIG. 1B). As discussed in greater detail below, this can enable the imaging system 100 to focus the internal lens 107 of the macro lens 104 on an intermediate image formed by the eyepiece 112.

In some embodiments, the internal lens 107 of the macro lens 104 can be electronically and/or automatically focused. For example, the second component 106b of the lens tube 106 can be moved in response to instructions received from the camera 102 and/or another computing device of the imaging system 100. As a specific example, the camera 102 can include software to control the movement and positioning of the second component 106b of the lens tube 106. In these embodiments, the positioning of the internal lens 107 of the macro lens 104 can be electronically adjusted (e.g., via the camera 102) along an axis generally parallel to the arrow A by extending the second component 106b outside of the first component 106a of the lens tube 106 and/or by retracting the second component 106b within the first component 106a. In these and other embodiments, the internal lens 107 of the macro lens 104 can be manually focused.

In operation, the internal lens 107 of the macro lens 104 can be focused onto an intermediate image plane close to a field stop position of the eyepiece 112. The field stop position of the eyepiece 112 can be in effect a position of where the eyepiece 112 is focused at infinity. Thus, when the internal lens 107 is focused on the field stop position of the eyepiece 112, the imaging system 100 can be focused on infinity. To focus the imaging system 100 at a shorter desired working distance than infinity, the physical position of the internal lens 107 can change to focus the internal lens 107 on an intermediate image plane located behind the field stop of the eyepiece 112. The imaging system 100 (in operation) is focused on a virtual image formed by DUT optics.

In some embodiments, the internal lens 107 of the macro lens 104 can be focused without translating and/or changing the size/length of the barrel of the macro lens 104. For example, the length of the barrel of the macro lens 104 can be fixed. Alternatively, the length of the barrel of the macro lens 104 can be changeable yet remain fixed while the position of the internal lens 107 is changed (e.g., while the internal lens 107 is focused). This can enable the imaging system 100 to focus the internal lens 107 on an intermediate image formed by the eyepiece 112 while the overall length of the imaging system 100 remains unchanged. For the sake of clarity and understanding of this feature of the present technology, the lens arrangement 101 (comprising the barrel of the macro lens 104, the baffle 108, the eyepiece mount 110, and the aperture 105 (or the component forming the aperture 105)) are illustrated with a fixed length L (e.g., 100 mm) in FIG. 1B even though (as discussed in greater detail below) the macro lens 104, the baffle 108, the eyepiece mount 110, the eyepiece 112, and/or the aperture 105 can be interchanged with other macro lenses 104, baffles 108, eyepiece mounts 110, eyepieces 112, and/or apertures 105, respectively, that may have different lengths that may change the overall length of the imaging system 100.

The constant length of the imaging system 100 while the position of the internal lens 107 is changed (e.g., to focus the internal lens 107) offers several advantages. For example, once the imaging system 100 is positioned such that the eyepiece 112 is at a desired location before a DUT, the imaging system 100 can adjust the position of the internal lens 107 of the macro lens 104 (e.g., to focus the internal lens 107 at different object planes) without changing the overall length of the imaging system 100 and without changing the position of the eyepiece 112. This can decrease the time required to correctly position the imaging system 100 to measure a DUT and/or can enable the imaging system 100 to take several measurements of the DUT without needing to reposition the imaging system 100 between the various different measurements. As a result, the time required to use the imaging system 100 to inspect a DUT can be minimized and/or reduced, which can increase through-put of DUT inspections.

In operation, the imaging system 100 can capture one or more measurements of a DUT. For example, light emitted from and/or reflected off a DUT positioned in front of the imaging system 100 can enter into the imaging system 100 via the aperture 105 and/or the eyepiece 112, and generally along the arrow A illustrated in FIGS. 1A and 1B. The eyepiece 112 can collect and focus this light to form an intermediate image at a location within the focal range of the macro lens 104. In some embodiments, the eyepiece 112 can collect and focus the light to form an intermediate image at a location within airspace 115 (FIG. 1B), the airspace 115 being bounded by a portion of the eyepiece mount 110, a portion of the baffle 108, and/or a portion of the barrel of the macro lens 104. In other embodiments, the eyepiece 112 can collect and focus the light to form an intermediate image at a location beyond the distal end of the imaging system 100. The intermediate image can be real or virtual. The baffle 108 can shield this airspace 115 from stray (e.g., ambient) light that does not enter the imaging system 100 via the eyepiece 112. The lens tube 106 can adjust the position the internal lens 107 of the macro lens 104 until the internal lens 107 is focused at an image plane corresponding to the location of the intermediate image (e.g., within the airspace 115). At this point, the internal lens 107 can be considered focused on the intermediate image formed by the eyepiece 112. The internal lens 107 can collect and focus the light of the intermediate image onto the image sensor 103 of the camera 102. In turn, the image sensor 103 can convert the light incident on the image sensor 103 to electrical signals that can be processed by a computing device, such as the camera 102 and/or another computing device (not shown) operably connected to the camera 102. In the context of product inspection, measurements captured by the imaging system 100 of a DUT can be used to verify one or more characteristics (e.g., color, brightness, angular distribution) of the DUT are correct, to perform various calibrations to bring the charac-teristics of a DUT into alignment with specified and/or acceptable parameters, and/or to reject a DUT altogether such that the DUT is not provided to an end user.

As discussed above, images captured by the imaging system 100 can be spatial or non-spatial. For example, the imaging system 100 can be a spatial imaging system that is used to capture still images or to record moving images of a DUT. Continuing with this example, the imaging system 100 can capture/measure/record color, brightness, and/or spatial information (e.g., relative location, shape, size, and/ or orientation data) of light emitted from the DUT. As another example, the imaging system 100 can be a non-spatial imaging system that is used to capture data of DUT that is independent of geometric considerations. Continuing with this example, the lens arrangement 101 of the imaging system 100 can form a conoscope lens that can facilitate measuring (e.g., in Fourier space, angular space, spectral space, etc.) an angular distribution of particular wavelengths of light emitted, reflected, or scattered by or from a DUT. In some embodiments, the same or similar imaging system 100 or lens arrangement 101 can be used to capture spatial and non-spatial images, such as by using different calibration routines to configure or reconfigure the imaging system 100 to capture one type of image or the other.

In some embodiments, various components of the imag-ing system 100 are interchangeable with other components. For example, if an imaging system 100 includes a first camera 102, a first image sensor 103, a first macro lens 104, a first baffle 108, a first eyepiece mount 110, a first eyepiece 112, and/or a first aperture 105; any one or more of these components can be swapped out for a second camera 102, a second image sensor 103, a second macro lens 104, a second baffle 108, a second eyepiece mount 110, a second eyepiece 112, and/or a second aperture, respectively. Interchangeable components can have same, similar, and/or different char-acteristics. In other words, imaging systems 100 configured in accordance with the present technology can be modular and can be readily adjusted such that they are suitable to capture various measurements, merely by swapping out components of the imaging systems 100 for other compo-nents of like kind but having different desired characteris-tics.

In some embodiments, a lens arrangement 101 of the present technology can be quickly dissembled into indi-vidual components (e.g., a macro lens 104, a baffle 108, an eyepiece mount 110, an eyepiece 112, and/or an aperture 105). In these embodiments, a macro lens 104 of the lens arrangement 101, for example, can be quickly detached from the lens arrangement 101 and swapped out for (e.g., replaced with) another macro lens 104 with same, similar, or different parameters. The other macro lens 104 can be compatible with the baffle 108, the eyepiece mount 110, the eyepiece 112, and/or the aperture 105 of the lens arrangement 101. Therefore, in the event that the other macro lens 104 has a different parameter from (e.g., a longer focal length capa-bility than) the replaced macro lens 104, the parameters (e.g., the focal length capability) of the lens arrangement 101 and/or of the imaging system 100 can be modified (in this example, lengthened) by installing the other macro lens 104 into the lens arrangement 101 in place of the replaced macro lens 104.

The modularity of imaging systems 100 configured in accordance with the present technology enables the imaging systems 100 to be readily adaptable to any one of various near-to-eye devices that may call for imaging systems 100 with different parameters (e.g., different angular FOVs, focus ranges, imaging qualities, form factors, etc.). As a specific example, a display DUT in a VR near-to-eye device might be configured to immerse a user by filling as much of the user's FOV as possible. In contrast, a display DUT in an AR near-to-eye device might be configured to present information in only a small portion of the user's FOV. As such, an imaging system 100 of the present technology can include a first camera 102, a first image sensor 103, a first macro lens 104, a first baffle 108, a first eyepiece mount 110, a first eyepiece 112, and/or a first aperture 105 such that the imaging system 100 is suitable (e.g., designed with a smaller angular FOV, such as ±20 degrees) for measuring the display DUT of the AR near-to-eye device. The same imaging system 100 can be quickly adapted such that the imaging system 100 is suitable (e.g., designed with a larger angular FOV, such as ±60 degrees) for measuring (in a single image) all of the information presented by the display of the VR near-to-eye device. For example, this can be achieved by swapping out the first image sensor 103, the first macro lens 104, the first eyepiece 112, and/or the first aperture 105 for a second image sensor 103, a second macro lens 104, a second eyepiece 112, and/or a second aperture 105 respectively, having different characteristics.

As such, continuing with the above example, the VR near-to-eye device does not require an entirely different imaging system 100 for measuring the display DUT of the VR near-to-eye device. Rather, the same imaging system 100 that was used for measuring the display DUT of the AR near-to-eye device can be adapted to measure the display DUT of the VR near-to-eye device merely by swapping out one or more components of the imaging system 100 for other components that provide the imaging system 100 parameters suitable for measuring the display DUT of the VR near-to-eye device. Thus, an imaging system 100 suitable for measuring the display DUT of the VR near-to-eye device can be assembled (i) quickly (e.g., in much less time than is conventionally possible, such as in weeks, days, hours, or minutes) and/or (ii) using various components from a previously assembled imaging system 100 that was suitable for measuring the display DUT of the AR near-to-eye device. Therefore, the present technology decreases time and cost expenditures typically spent on researching, developing, sourcing, and/or testing an entirely new optical systems for measuring the display DUTs of various different near-to-eye devices.

In some embodiments, to facilitate the modularity of the imaging systems 100 of the present technology, components of the imaging system 100 can be (e.g., removably, operably, mechanically, and/or electrically) connected to and/or disconnected from one another in a consistent and/or uniform manner. For example, a first eyepiece mount 110 can include threading, screws, buckles, lock pins, and/or other connection means that can be used to removably and/or mechanically connect the first eyepiece mount 110 to a baffle 108 and/or to a macro lens 104. Continuing with this example, a second eyepiece mount 110 can include the same or similar threading, screws, buckles, lock pins, and/or other connection means that also can be used to removably and/or mechanically connect the second eyepiece mount 110 to the baffle 108 and/or the macro lens 104. This can facilitate easily (i) disconnecting the first eyepiece mount 110 from the baffle 108 and/or the macro lens 104 and (ii) replacing it with the second eyepiece mount 110 (and vice versa). This same concept can be extended to the connection means used to (e.g., removably) connect the image sensor 103 to the camera 102, the macro lens 104 to the camera 102, the baffle 108 to the macro lens 104, and/or the eyepiece 112 to the eyepiece mount 110. Furthermore, two different image sensors 103 of the present technology can have the same or similar connection means for electrically connecting either of the image sensors 103 to a camera 102. Additionally, or alternatively, two different macro lenses 104 of the present technology can have the same or similar connection means for electrically connecting either of the macro lenses 104 to an image sensor 103 and/or to a camera 102.

In these and other embodiments, the imaging system 100 can include one or more other components in addition to or in lieu of one or more components illustrated in FIGS. 1A and 1B. For example, the camera 102 can be coupled to a computer (not shown) that includes signal processing hardware and/or software to analyze data captured by the camera 102. Additionally, or alternatively, the camera 102 can be coupled to one or more displays configured to provide feedback to a system user. In these and other embodiments, the camera 102 can include onboard signal processing hardware and/or software, and/or can include an onboard display.

As another example, the imaging system 100 can include a teleconverter (not shown). The teleconverter can be positioned between the image sensor 103 of the camera 102 and the macro lens 104. A teleconverter can increase the versatility of the imaging system 100. For example, the teleconverter can be used to adjust a FOV and/or imaging quality of the imaging system 100. Thus, the teleconverter can enable compatibility of a macro lens 104 with various different shapes and/or sizes of image sensors 103.

As a specific example, the teleconverter can be used in combination with a 100 mm macro lens 104 to increase the focal length capability of the imaging system 100 to 200 mm to facilitate measuring a DUT at a focal length of 200 mm without a 200 mm macro lens. Thus, in this example, the teleconverter can enable the imaging system 100 to capture both (a) a measurement of a larger area (e.g., a group of pixels) of a DUT in a single image consistent with the 100 mm capability of the macro lens 104 and (b) a measurement of a smaller area (e.g., an individual pixel) of a DUT in a single image consistent with the capability of a 200 mm lens without swapping out the 100 mm macro lens 104 for a 200 mm macro lens 104 between measurements. The teleconverter also provides a user of the imaging system 100 the flexibility to use a macro lens 104 having features (e.g., software, an first angular FOV, etc.) with which the user is most familiar or prefers in combination with a camera 102 and/or image sensor 103 (e.g., an image sensor 103 with a particular aspect ratio) that typically is used with another macro lens 104 having different features (e.g., software, a second angular FOV, etc.) with which the user is less familiar or prefers less.

Figures 2A, 2B:
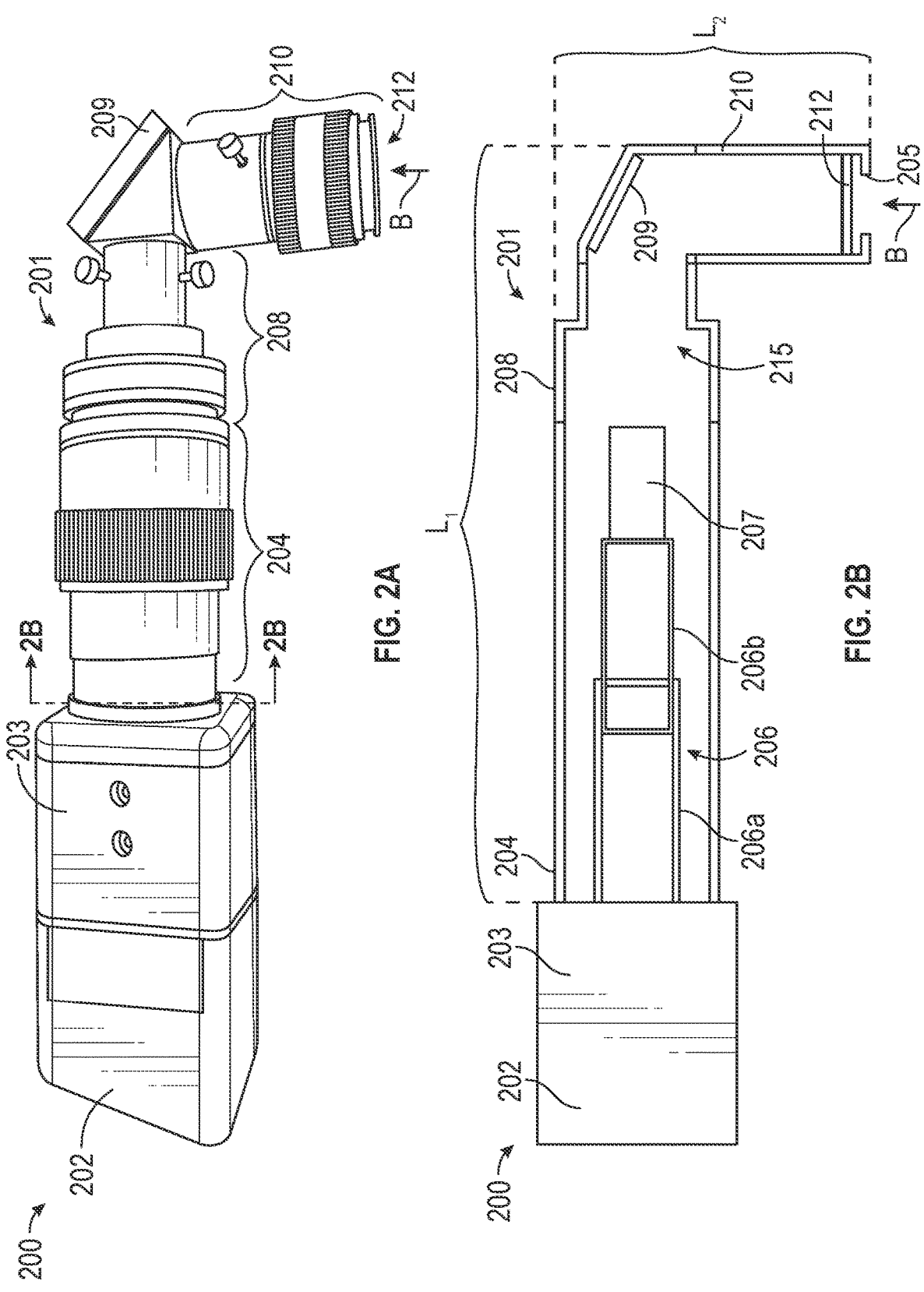
FIG. 2A is a side view of another imaging system configured in accordance with various embodiments of the present technology.
FIG. 2B is a schematic, partial cross-sectional side view of the imaging system of FIG. 2A.

FIG. 2A is a side view of another imaging system 200 configured in accordance with various embodiments of the present technology, and FIG. 2B is a schematic, partial cross-sectional side view of the imaging system 200 of FIG. 2A taken along line 2B-2B in FIG. 2A. The imaging system 200 is generally similar to the imaging system 100. (Thus, similar reference numbers are used to indicate similar elements across FIGS. 1A-2B, but the individual elements may not be identical.) For example, as shown in FIG. 2A, the imaging system 200 includes a lens arrangement 201 and a machine or camera 202. The camera 202 includes an image sensor 203. The lens arrangement 201 includes a macro lens 204 (only a housing or barrel of the macro lens 204 is illustrated in FIG. 2A), a baffle 208, an eyepiece 212, and (optionally) an aperture 205 (FIG. 2B). The eyepiece 212 is mounted in an eyepiece mount 210. Furthermore, as shown in FIG. 2B, the macro lens 204 includes a lens tube 206 and an internal lens 207. The lens tube 206 includes a first stationary component 206a and a second movable component 206b. In some embodiments, the imaging system 200 can additionally include a mount that can be used to position and hold the imaging system 200 at a desired location and/or orientation.

The imaging system 200 illustrated in FIGS. 2A and 2B differs from the imaging system 100 illustrated in FIGS. 1A and 1B, however, in that the lens arrangement 201 (i) additionally includes a mirror 209 and (ii) is folded (e.g., the barrel of the macro lens 204, the baffle 208, a housing or mount of the mirror 209, the eyepiece mount 210, and/or the component forming the aperture 205 is/are bent, curved, etc. and/or includes approximately a 90-degree turn). The folded configuration of the lens arrangement 201 facilitates positioning the imaging system 200 in front of a DUT (e.g., for measuring the DUT) in the event there is a limited amount of space available in front of and/or surrounding the DUT within which to position the imaging system 200. For example, as discussed in greater detail below with respect to FIGS. 3 and 4, a long dimension of the imaging system 200 (e.g., a dimension including the camera 202, the image sensor 203, the macro lens 204, the baffle 208, and/or the mirror 209) can be positioned generally parallel to an image plane of the imaging system 200 and/or an object plane of a DUT. In other words, the long dimension of the imaging system 200 can be positioned generally perpendicular to arrow B illustrated in FIGS. 2A and 2B. Additionally, or alternatively, a short dimension of the imaging system 200 (e.g., a dimension including the mirror 209, the eyepiece mount 210, the eyepiece 212, and/or the aperture 205) can be positioned generally perpendicular to the image plane of the imaging system 200 and/or the object plane of a DUT. In other words, the short dimension of the imaging system can be positioned generally parallel to the arrow B. The folded configuration of the imaging system 200 can facilitate using two or more imaging systems 200 to (e.g., simultaneously) measure one or more DUTs, as discussed in greater detail below.

Similar to the imaging system 100 of FIGS. 1A and 1B, the imaging system 200 includes an eyepiece 212 mounted at or near a distalmost end portion of the eyepiece mount 210 such that an entrance pupil of the lens arrangement 201 and/or of the imaging system 200 is not buried. Another similarity between the imaging system 100 and the imaging system 200 is that the internal lens 207 of the macro lens 204 can be manually, electronically, and/or automatically focused (e.g., using the lens tube 206). In these and other embodiments, the internal lens 207 can be focused without rotating and/or changing the size/length of the barrel of the macro lens 204. For example, the length of the barrel of the macro lens 204 can be fixed. Alternatively, the length of the barrel of the macro lens 204 can be changeable yet remain fixed while the position of the internal lens 207 is changed (e.g., while the internal lens 207 is focused). This can enable the imaging system 200 to focus the internal lens 207 on an intermediate image produced by the eyepiece 212 while an overall length of the imaging system 200 remains unchanged. For the sake of clarity and understanding of this feature of the present technology, the lens arrangement 201 (comprising the barrel of the macro lens 204, the baffle 208, the mirror mount, and the eyepiece mount 210) are illustrated with a first fixed length $L_1$ and/or a second fixed length $L_2$ in FIG. 2B, even though the imaging system 200 can be modular (generally similar to the imaging system 100) such that the components of the lens arrangement 201 can be interchanged with other components having different corresponding lengths, which may alter the length $L_1$ and/or the length $L_2$ of the lens arrangement 201.

The imaging system 200 can include one or more other components in addition to or in lieu of one or more components illustrated in FIGS. 2A and 2B. For example, the camera 202 can be coupled to a computer (not shown) that includes signal processing hardware and/or software to analyze data captured by the camera 202. Additionally, or alternatively, the camera 202 can be coupled to one or more displays configured to provide feedback to a system user. In these and other embodiments, the camera 202 can include onboard signal processing hardware and/or software, and/or can include an onboard display. In these and still other embodiments, the imaging system 200 can include a tele-converter (not shown).

In operation, the imaging system 200 can capture one or more measurements of a DUT. For example, light emitted from and/or reflected off a DUT positioned in front of the imaging system 200 (e.g., in front of the eyepiece 212) can enter into the imaging system 200 via the aperture 205 and/or the eyepiece 212, and generally along the arrow B illustrated in FIGS. 2A and 2B. The eyepiece 212 can collect and focus this light to form an intermediate image (e.g., a real or virtual image) at a location within the focal range of the macro lens 104. In some embodiments, the eyepiece 112 can collect and focus the light to form an intermediate image at a location within airspace 215 (FIG. 2B), the airspace 215 being bounded by a portion of the eyepiece mount 210, a portion of the baffle 208, a portion of the mirror 209, a portion of the mirror mount, and/or a portion of the barrel of the macro lens 204. For example, the eyepiece 212 can focus the light to form an intermediate image on the mirror 209. As another example, the eyepiece 212 can focus the light at a first location within the airspace 215 between the eyepiece 212 and the mirror 209. As still another example, the eyepiece 212 can focus the light (e.g., using the mirror 209) at a second location within the airspace 215 between the mirror 209 and the macro lens 204. In other embodiments, the eyepiece 112 can collect and focus the light to form an intermediate image at a location beyond the distal end of the imaging system 100. The baffle 208 can shield this airspace 215 from stray (e.g., ambient) light that does not enter the imaging system 200 via the eyepiece 212.

The lens tube 206 can adjust the position the internal lens 207 of the macro lens 204 until the internal lens 207 is focused at an image plane corresponding to the location of the intermediate image within the airspace 215. For example, the lens tube 206 can adjust the position of the internal lens 207 until the internal lens 207 is focused at the image plane on the mirror 209. As another example, the lens tube 206 can focus the internal lens 207 (e.g., using the mirror 209) at the image plane at the first location within the airspace 215 between the eyepiece 212 and the mirror 209. As still another example, the lens tube 206 can focus the internal lens 207 at the second location within the airspace 215 between the mirror 209 and the macro lens 204. Once focused at the image plane corresponding to the location of the intermediate image within the airspace 215, the internal lens 207 can be considered focused on the intermediate image formed by the eyepiece 212 and/or the mirror 209.

The internal lens 207 can collect and focus the light of the intermediate image onto the image sensor 203 of the camera 202. In turn, the image sensor 203 can convert the light incident on the image sensor 203 to electrical signals that can be processed by a computing device, such as the camera 202 and/or another computing device (not shown) operably connected to the camera 202. In the context of product inspection, measurements captured by the imaging system 200 of a DUT can be used to verify one or more character-istics (e.g., color and/or brightness) of the DUT are correct, to perform various calibrations to bring the characteristics of a DUT into alignment with specified and/or acceptable parameters, and/or to reject a DUT altogether such that the DUT is not provided to an end user.

Similar to the imaging system 100, images captured by the imaging system 200 can be spatial or non-spatial. In some embodiments, the same or similar imaging system 200 or lens arrangement 201 can be used to capture spatial and non-spatial images, such as by using different calibration routines to configure or reconfigure the imaging system 100 to capture one type of image or the other.

Figure 3:
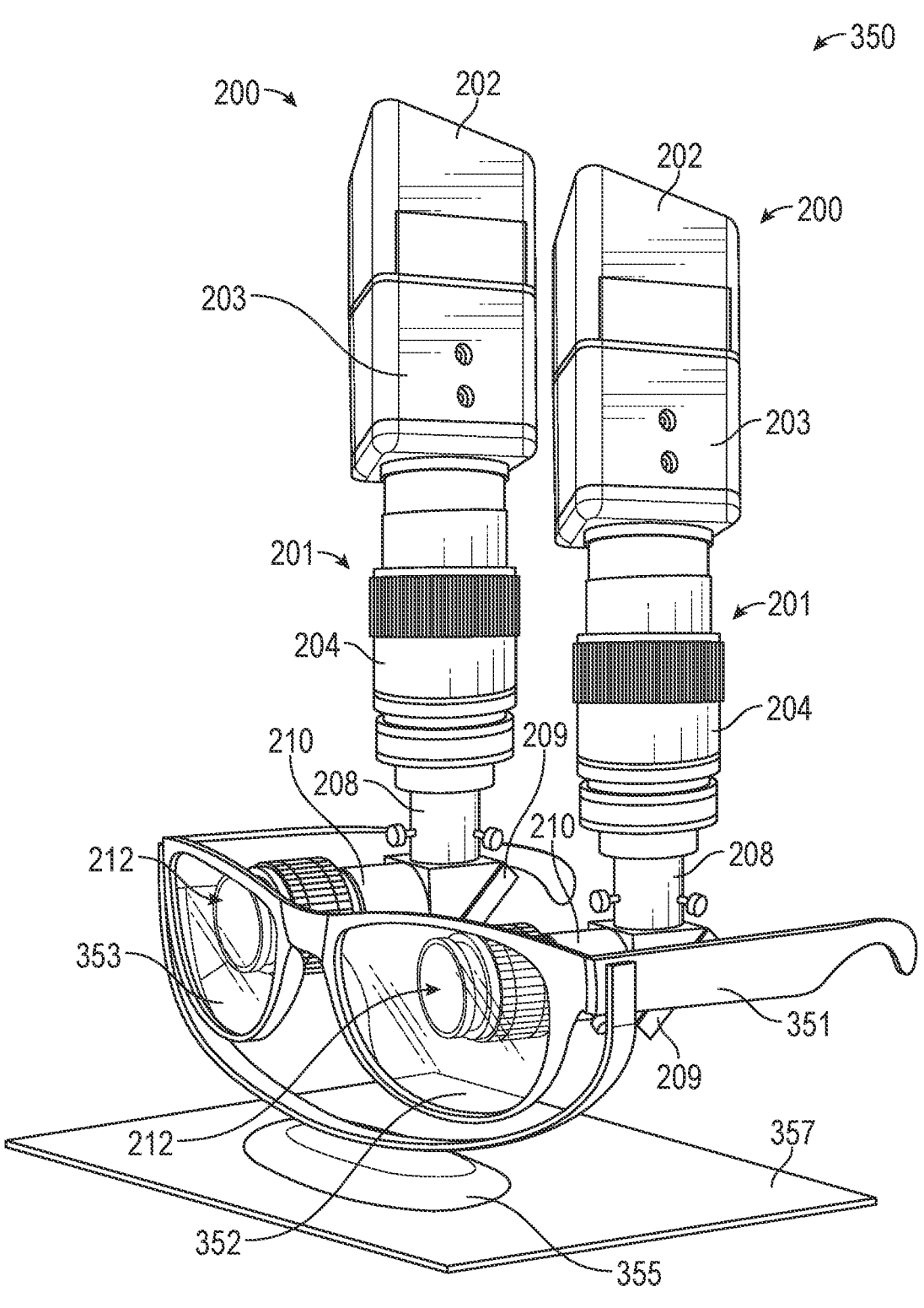
FIG. 3 is a side perspective view of an arrangement of imaging systems configured in accordance with various embodiments of the present technology.

FIG. 3 is a side perspective view of an example system or arrangement 350 configured in accordance with various embodiments of the present technology. As shown, the arrangement 350 includes two of the imaging systems 200 of FIGS. 2A and 2B that lack the aperture 205. The arrange-ment 350 further includes a near-to-eye device 351 having a DUT 352 and a DUT 353. In the illustrated embodiment, the near-to-eye device 351 is AR glasses and the DUTs 352 and 353 are displays configured to enhance the real-world environment of a human user by presenting computer-generated perceptual information to a corresponding eye of the user. The near-to-eye device 351 is supported by a mount 355 that is positioned on a table 357.

Each imaging system 200 in FIG. 3 is positioned (e.g., using one or more mounts) in front of and aligned with the DUT 352 or the DUT 353 of the near-to-eye device 351. In particular, an exit pupil of an eyepiece 212 of each imaging system 200 can be positioned at a location corresponding to where a human eye pupil would be positioned should the near-to-eye device 351 be used by a human as intended. Additionally, or alternatively, the eyepieces 212 of the imaging systems 200 are positioned at locations in front of respective DUTs 352 and 353 such that the imaging systems 200 can view the same or similar information as the DUTs 352 and 353 would present to a user's eyes when the user wears or employs the near-to-eye device 351 as intended. As discussed in greater detail above, the positions of the eye-pieces 212 can remain unchanged in some embodiments while the macro lenses 204 are focused onto respective virtual images of the DUTs 353 and/or 353 formed by the eyepieces 212.

As shown, the imaging systems 200 and/or the lens arrangements 201 have a folded configuration. The folded configurations of the imaging systems 200 and/or the lens arrangements 201 can facilitate positioning the imaging systems 200 side-by-side with the long dimensions of the imaging systems 200 (e.g., dimensions comprising the cam-eras 202, the image sensors 203, the macro lenses 204, the baffles 208, the mirrors 209, and/or the mirror mounts of the imaging systems 200) positioned generally parallel to image planes of the imaging systems 200 and/or object planes of the DUTs 352 and 353. The short dimensions (e.g., only the short dimensions) of the imaging systems 200 (e.g., dimen-sions comprising the mirrors 209, the mirror mounts, the eyepiece mounts 210, and the eyepieces 212 of the imaging systems 200) are positioned generally perpendicular to the image planes of the imaging systems 200 and/or the object planes of the DUTs 352 and 353. In other words, the bulk of the imaging systems 200 can be positioned at locations other than in front of the DUTs 352 and 353. This can facilitate positioning the image systems 200 in areas in front of the DUTs 352 and 353 (e.g., to measure the DUTs 352 and 353) even when there are space constraints in these areas, for example, due to other components of the near-to-eye device 351, other components (not shown) of the imaging systems 200, and/or other components (not shown) of the arrange-ment 350.

Use of two imaging systems 200 in the arrangement 350 can facilitate stereoscopic and/or simultaneous imaging/measurement of the DUTs 352 and 353. This can decrease the amount of time required to measure the DUTs 352 and/or 353, especially in comparison to other arrangements that include a single (e.g., only one) imaging system. Further-more, the amount of time required to measure the DUTs 352 and/or 353 can also be reduced in embodiments in which the imaging systems 200 can capture all information of interest presented by the DUTs 352 and/or 353 in a single image or shot and/or without needing to reposition the imaging sys-tems 200 to measure other portions of the DUTs 352 and/or 353. As such, the present technology can increase through-put of inspected DUTs (e.g., in comparison to conventional imaging systems) in a variety of ways.

In these and other embodiments, the imaging systems 200 in the arrangement 350 can be configured to take multiple (e.g., separate) measurements of the DUTs 352 and/or 353, such as of different portions of the DUTs 352 and/or 353 and/or different measurements of a same portion of the DUTs 352 and/or 353. In some embodiments, the positions of the eyepieces 212 of the imaging systems 200 relative to the DUTs 352 and/or 353 can be changed (e.g., adjusted, altered, etc.) to facilitate the multiple measurements of the DUTs 352 and/or 353. For example, the imaging systems 200 can be repositioned and/or can scan the DUTs 352 and/or 353 while the near-to-eye device 351 remains sta-tionary. Alternatively, the mount 355 and/or table 357 can be configured to reposition the near-to-eye device 351 while the imaging systems 200 remain stationary. As yet another example, the positions of both the imaging systems 200 and the near-to-eye device 351 can be changed to facilitate the multiple measurements of the DUTs 352 and/or 353.

Figure 4:
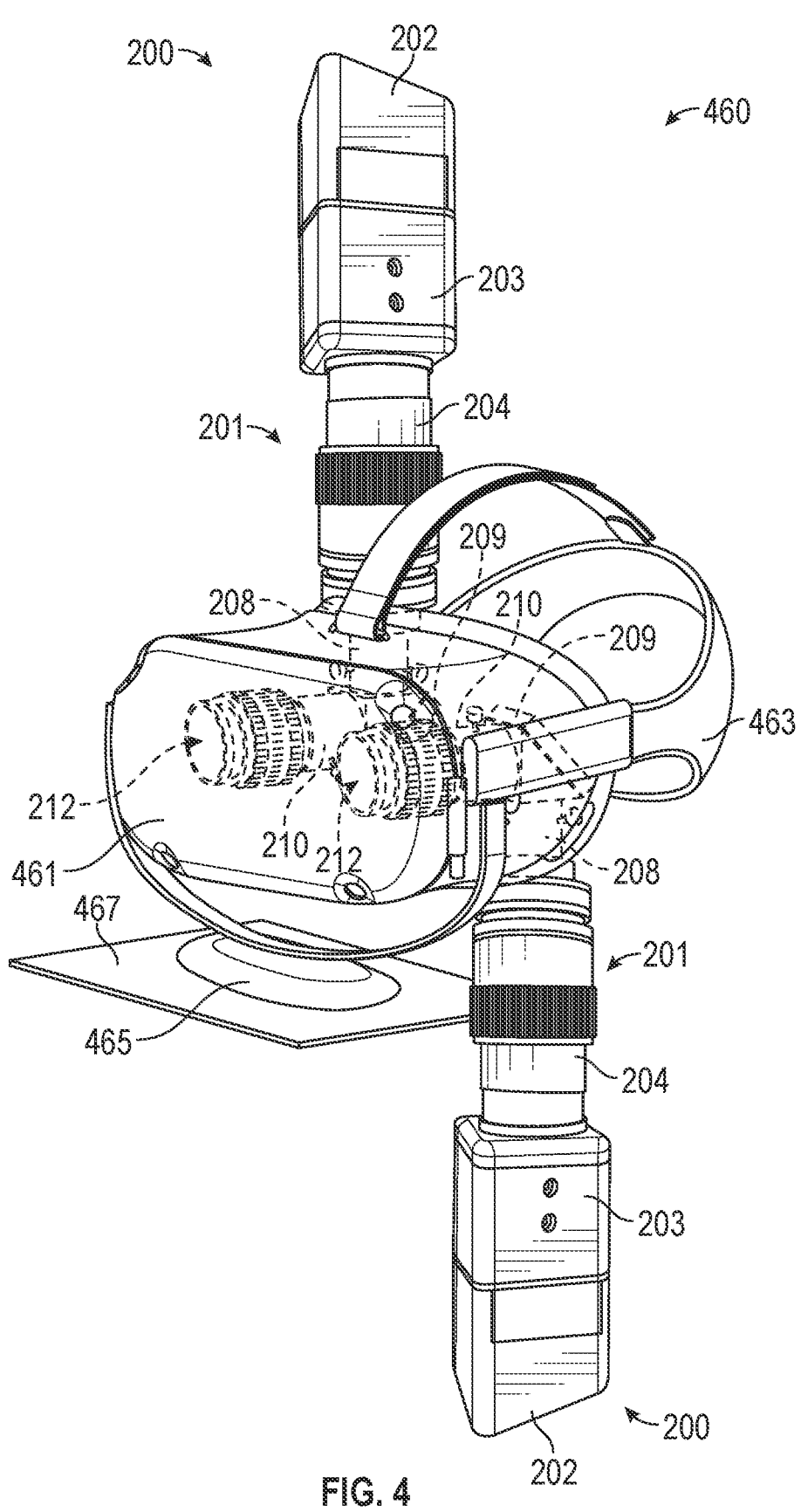
FIG. 4 is a side perspective view of another arrangement of imaging systems configured in accordance with various embodiments of the present technology.

FIG. 4 is a side perspective view of another system or arrangement 460 configured in accordance with various embodiments of the present technology. As shown, the arrangement 460 includes two of the imaging systems 200 of FIGS. 2A and 2B that lack the aperture 205. The arrange-ment 460 further includes a near-to-eye device 461 having one or more DUTs (not shown), such as one or more displays. In the illustrated embodiment, the near-to-eye device 461 is a VR headset (e.g., VR goggles). Thus, the one or more DUTs of the VR headset can be configured to replace a real-world environment by presenting a computer-generated, simulated environment to one or more eyes of a user. The VR headset 461 in FIG. 4 is supported by a mount 465 that is positioned on a table 467.

The arrangement 460 illustrated in FIG. 4 is generally similar to the arrangement 350 of FIG. 3. For example, each imaging system 200 illustrated in FIG. 4 can be positioned (e.g., using one or more mounts) in front of and aligned with the one or more DUTs of the near-to-eye device 461. The position of the eyepiece 212 of each imaging system 200 can remain unchanged while the macro lenses 204 are focused onto respective virtual images of the one or more DUTs formed by the eyepieces 212. The two imaging systems 200 in the arrangement 460 can similarly facilitate stereoscopic and/or simultaneous imaging/measurement of the one or more DUTs. Additionally, or alternatively, the imaging sys-tems 200 in the arrangement 460 can be configured to take a single and/or multiple (e.g., separate) measurements of the one or more DUTs. In some embodiments, the positions of the eyepieces 212 of the imaging systems 200 relative to the one or more DUTs can be changed (e.g., adjusted, altered, etc.) by, for example, repositioning the imaging systems 200 and/or the near-to-eye device 461 (e.g., using the mount 465 and/or the table 467).

The folded configurations of the imaging systems 200 and/or the lens arrangements 201 in FIG. 4 also facilitate positioning the imaging systems 200 side-by-side with (i) the long dimensions of the imaging systems 200 positioned generally parallel to image planes of the imaging systems 200 and/or object planes of the one or more DUTs and (ii) the bulk of the imaging systems 200 positioned at locations other than in front of the one or more DUTs. The short dimensions of the imaging systems 200 (e.g., only the short dimensions of the imaging systems 200) are positioned generally perpendicular to the image planes of the imaging systems 200 and/or the object planes of the one or more DUTs in the illustrated embodiment. In other words, the folded configurations of the lens arrangements 201 and/or the imaging systems 200 facilitates positioning the image systems 200 in front of the one or more DUTs (e.g., to measure the one or more DUTs) even though a headband 463 of the near-to-eye device 461 limits the amount of space in front of the one or more DUTs within which to position the imaging systems 200.

The arrangement 460 of FIG. 4 differs from the arrangement 350 of FIG. 3, however, in that one of the imaging systems 200 is positioned in a generally upward orientation while the other of the imaging systems 200 is positioned in a generally downward orientation. Other orientations for the imaging system(s) 200 are of course possible. For example, the imaging systems 200 in other arrangements can be configured such that (i) the imaging systems 200 are both oriented generally upward (similar to the imaging systems 200 in the arrangement 350 of FIG. 3), (ii) the imaging systems 200 are both oriented generally downward, (iii) the imaging systems 200 are oriented opposite to what is illustrated in FIG. 4 (e.g., with the one of the imaging systems 200 positioned in a generally downward orientation and the other of the imaging systems 200 positioned in a generally upward orientation), (iv) the imaging systems 200 are oriented with one or both of the imaging systems 200 oriented in a generally sideways orientation, and/or (v) any of the various combinations thereof.

Although two imaging systems 200 are shown in the arrangements 350 and 460 illustrated in FIGS. 3 and 4, respectively, other arrangements configured in accordance with other embodiments of the present technology can include a greater (e.g., more than two) or lesser (e.g., one) number of imaging systems per arrangement. For example, four imaging systems 200 can be used to (e.g., simultaneously) measure the DUT(s) of the near-to-eye device 351 and/or of the near-to-eye device 461. In some embodiments, arrangements of the present technology can include a same or lesser number of imaging systems as the number of DUTs (e.g., displays) included in a near-to-eye device.

Furthermore, although the arrangements 350 and 460 illustrated in FIGS. 3 and 4, respectively, include two imaging systems 200 of FIGS. 2A and 2B, arrangements configured in accordance with other embodiments of the present technology can include one or more imaging systems 100 of FIGS. 1A and 1B. For example, arrangements configured in accordance with other embodiments of the present technology can include two imaging systems 100 arranged side-by-side in a manner generally similar to the arrangements 350 and/or 460. Additionally, or alternatively, arrangements configured in accordance with other embodiments of the present technology can include an imaging system 100 arranged side-by-side with an imaging system 200 in a manner generally similar to the arrangements 350 and/or 460.

2. Associated Methods

Figure 5:
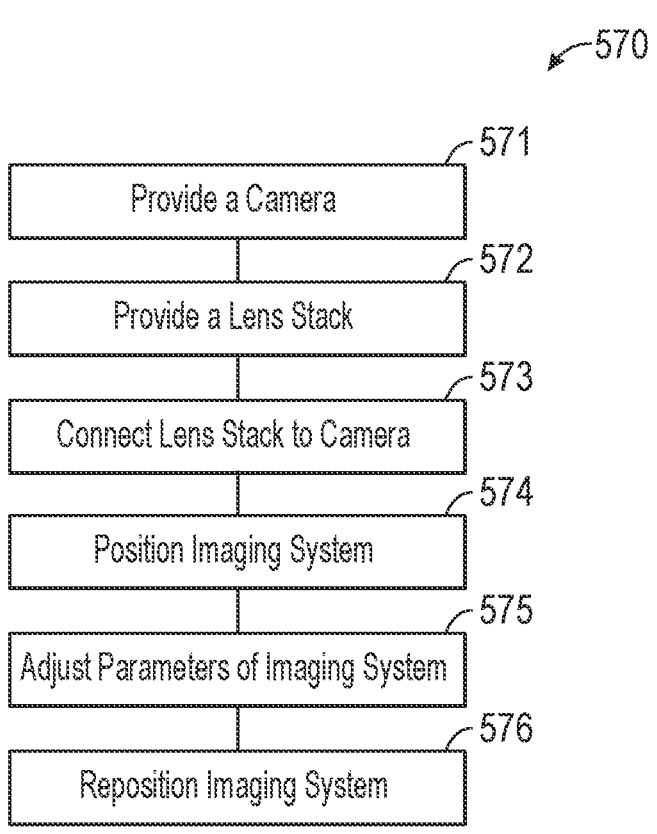
FIG. 5 is a flow diagram illustrating a method of assembling and/or providing an imaging system in accordance with various embodiments of the present technology.

FIG. 5 is a flow diagram illustrating a method 570 of assembling and/or providing an imaging system in accordance with various embodiments of the present technology. All or a subset of the steps of the method 570 can be executed by various components or devices of an imaging system, such as an imaging system 100 of FIGS. 1A and 1B, an imaging system 200 of FIGS. 2A-4, and/or another suitable imaging system. Additionally, or alternatively, all or a subset of the steps of the method 570 can be executed by a user (e.g., an operator, a technician, an engineer, etc.) of the imaging system. In these and other embodiments, one or more steps of the method 570 can be executed by a DUT. Furthermore, any one or more of the steps of the method 570 can be executed in accordance with the discussion above.

The method 570 begins at block 571 by providing a camera. In some embodiments, providing a camera includes providing an image sensor. The method 570 can continue at block 572 by providing a lens arrangement. In some embodiments, providing a lens arrangement includes providing a macro lens, a baffle, an eyepiece (e.g., an eyepiece positioned in an eyepiece mount), and/or an aperture (e.g., a component forming the aperture). Providing the macro lens can include providing an electronically-focusable and/or automatically-focusable macro lens. Providing the eyepiece can include installing an eyepiece into an eyepiece mount in a reversed orientation. In these and other embodiments, providing the lens arrangement can include removably, operably, mechanically, and/or electrically connecting (a) the macro lens to the baffle, (b) the baffle to the eyepiece mount, (c) the macro lens (e.g., directly or indirectly) to the eyepiece mount, and/or (d) the eyepiece mount to the component forming the aperture. Connecting the eyepiece mount to the baffle and/or to the macro lens can include connecting the eyepiece mount to the baffle and/or to the macro lens such that the eyepiece is in a reversed orientation (as discussed in greater detail above with respect to FIGS. 1A and 1B). In these and still other embodiments, providing the lens arrangement can include (a) providing a teleconverter and/or (b) removably, operably, mechanically, and/or electrically connecting the teleconverter to the macro lens.

The method 570 can continue at block 573 by removably, operably, mechanically, and/or electrically connecting the lens arrangement to the camera and/or to the image sensor, to form an imaging system. The method 570 can continue at block 574 by positioning the imaging system. Positioning the imaging system can include positioning the imaging system such that the imaging system is in front of and/or is aligned with a first DUT.

In some embodiments, the method 570 can continue at block 575 by adjusting (e.g., modifying, adapting, changing, altering, etc.) parameters of the imaging system. For example, the camera, the image sensor, the teleconverter, the macro lens, the baffle, the eyepiece mount, and/or the eyepiece can be a first camera, a first image sensor, a first teleconverter, a first macro lens, a first baffle, a first eyepiece mount, a first eyepiece, and/or a first aperture. Continuing with this example, adjusting the parameters of the imaging system can include disassembling (in whole or in part) the first camera and/or the lens arrangement. In these and other embodiments, adjusting the parameters of the imaging system can include operably, mechanically, and/or electrically disconnecting the first camera, the first image sensor, the first teleconverter, the first macro lens, the first baffle, the first eyepiece mount, the first eyepiece, and/or the first aperture from the imaging system, the first camera, and/or the lens arrangement. In these and still other embodiments adjusting the parameters of the imaging system can include replacing one or more of (a) the first camera, the first image sensor, the first teleconverter, the first macro lens, the first baffle, the first eyepiece mount, the first eyepiece, and/or the first aperture with one or more of (b) a second camera, a second image sensor, a second teleconverter, a second macro lens, a second baffle, a second eyepiece mount, a second eyepiece, and/or a second aperture, respectively, having same, similar, and/or different parameters. Replacing the one or more first components with the one or more second components can include removably, operably, mechanically, and/or electrically connecting (consistent with the discussion above) various ones of the one or more second components to (i) various other ones of the one or more second components and/or (ii) various first components of the imaging systems that were not replaced.

The method 570 can continue at block 576 by repositioning the imaging system. Repositioning the imaging system can include positioning the imaging system such that the imaging system is in front of and/or is aligned with a DUT. The DUT can be the first DUT discussed above and/or a second DUT different from the first DUT.

Although the steps of the method 570 are discussed and illustrated in a particular order, the method 570 of FIG. 5 is not so limited. In other embodiments, the steps of the method 570 can be performed in a different order. In these and other embodiments, any of the steps of the method 570 can be performed before, during, and/or after any of the other steps of the method 570. Furthermore, a person skilled in the art will readily recognize that the method 570 can be altered and still remain within these and other embodiments of the present technology. For example, one or more steps of the method 570 can be omitted and/or repeated in some embodiments. As another example, the method 570 can include additional steps than shown in FIG. 5. For example, the method 570 can include a calibration step during which the imaging system is calibrated to capture spatial images or measurements of light emitted by or from a DUT or is calibrated (e.g., as a conoscope) to capture non-spatial images or measurements of light emitted by or from a DUT.

Figure 6:
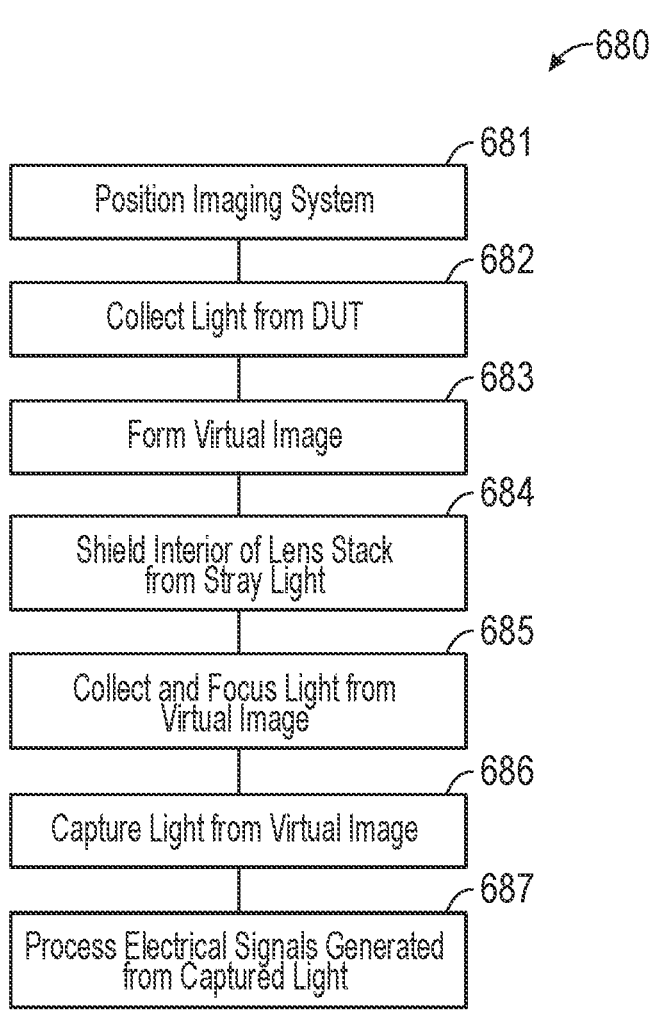
FIG. 6 is a flow diagram illustrating a method of operating one or more imaging systems in accordance with various embodiments of the present technology.

FIG. 6 is a flow diagram illustrating a method 680 of operating one or more imaging systems in accordance with various embodiments of the present technology. All or a subset of the steps of the method 680 can be executed by various components or devices of one or more imaging systems, such as one or more imaging systems 100 of FIGS. 1A and 1B, one or more imaging systems 200 of FIGS. 2A-4, and/or one or more other suitable imaging systems. Additionally, or alternatively, all or a subset of the steps of the method 680 can be executed by a user (e.g., an operator, a technician, an engineer, etc.) of the imaging system(s). In these and other embodiments, one or more steps of the methods can be executed by a DUT. Furthermore, any one or more of the steps of the method 680 can be executed in accordance with the discussion above. For example, one or more of the steps of the method 680 can be executed (e.g., simultaneously performed) by more than one imaging system, such as by two imaging systems measuring one or more DUTs (e.g., a same DUT and/or different DUTs).

The method 680 begins at block 681 by positioning the imaging system. Positioning the imaging system can include positioning the imaging system such that the imaging system is in front of and/or is aligned with a DUT. In some embodiments, positioning the imaging system includes changing a position of the imaging system relative to a position of the DUT. Additionally, or alternatively, positioning the imaging system includes changing a position of the DUT relative to a position of the imaging system. In these and other embodiments, positioning the imaging system including positioning an exit pupil of an eyepiece of the imaging system (i) at a location corresponding to a location at which a human eye pupil would be positioned when a human user operates the DUT (or a device including the DUT) as intended, and/or (ii) such that the imaging system can view and/or measure same or similar information presented by the DUT that the DUT would present to the eye when the human user operates the DUT (or a device including the DUT) as intended.

The method 680 continues at block 682 by collecting (e.g., via the aperture and/or using the eyepiece) light emitted from and/or reflected by the DUT. The method 680 can continue at bock 683 by forming (e.g., using the eyepiece) an intermediate image from the collected light. Forming the intermediate image can include (a) forming the intermediate image by focusing the collected light, and/or (b) forming the intermediate image at a location within the focal range of a macro lens of the imaging system. In some embodiments, the intermediate image can be formed within an interior of (e.g., within airspace inside of) a lens arrangement of the imaging system. In these and other embodiments, forming the intermediate image can include forming the intermediate image using a mirror of the lens arrangement. For example, the collected light can be focused on to the mirror and/or redirected (e.g., reflected) along a different optical axis and/or to another location by the mirror. In these and still other embodiments, the intermediate image can be formed at a location beyond a distal end of the imaging system. The intermediate image can be real or virtual, and/or can be spatial or non-spatial. In some embodiments, the method 680 continues at block 684 by shielding (e.g., using a baffle of the imaging system) the interior of the lens arrangement from stray (e.g., ambient) light not introduced into the lens arrangement via the eyepiece.

The method 680 can continue at block 685 by collecting (e.g., using the macro lens) light forming the intermediate image and/or focusing (e.g., using the macro lens) the light forming the intermediate image. Collecting and/or focusing the light forming the intermediate image using the macro lens can include manually, electronically, and/or automatically focusing the macro lens. In these and other embodiments, focusing the macro lens includes focusing the macro lens without changing (e.g., altering, modifying, etc.) (a) a length of the imaging system and/or (b) the position of the eyepiece. In these and still other embodiments, focusing the macro lens includes focusing the macro lens on the intermediate image (e.g., by focusing the macro lens onto an image plane corresponding to the location of the intermediate image). In some embodiments, focusing the macro lens includes focusing the macro lens using a mirror of the imaging system. Focusing the light from the intermediate image can include focusing the light forming the intermediate image onto an image sensor of a camera and/or of the imaging system.

The method 680 can continue at block 686 by capturing (e.g., using the image sensor) the light forming the intermediate image and converting (e.g., using the image sensor) the light into electrical signals. In these and other embodiments, the method 680 can continue at block 687 by processing (e.g., using a computing device, such as the camera and/or another computing device of the imaging system) the electrical signals. In some embodiments, processing the electrical signals can include (a) verifying one or more characteristics (e.g., color, brightness, angular distribution) of light emitted by or from the DUT are correct, (b) performing various calibrations to bring the characteristics into alignment with specified and/or acceptable parameters, and/or (c) rejecting the DUT such that the DUT is not provided to an end user.

Although the steps of the method 680 are discussed and illustrated in a particular order, the method 680 of FIG. 6 is not so limited. In other embodiments, the steps of the method 680 can be performed in a different order. In these and other embodiments, any of the steps of the method 680 can be performed before, during, and/or after any of the other steps of the method 680. Furthermore, a person skilled in the art will readily recognize that the method 680 can be altered and still remain within these and other embodiments of the present technology. For example, one or more steps of the method 680 can be omitted and/or repeated in some embodiments.

Although not shown so as to avoid unnecessarily obscuring the description of the embodiments of the technology, any of the forgoing systems and methods described above can include and/or be performed by a computing device configured to direct and/or arrange components of the systems and/or to receive, arrange, store, analyze, and/or otherwise process data received, for example, from the machine and/or other components of the systems. As such, such a computing device includes the necessary hardware and corresponding computer-executable instructions to perform these tasks. More specifically, a computing device configured in accordance with an embodiment of the present technology can include a processor, a storage device, input/output device, one or more sensors, and/or any other suitable subsystems and/or components (e.g., displays, speakers, communication modules, etc.). The storage device can include a set of circuits or a network of storage components configured to retain information and provide access to the retained information. For example, the storage device can include volatile and/or non-volatile memory. As a more specific example, the storage device can include random access memory (RAM), magnetic disks or tapes, and/or flash memory.

The computing device can also include (e.g., non-transitory) computer readable media (e.g., the storage device, disk drives, and/or other storage media) including computer-executable instructions stored thereon that, when executed by the processor and/or computing device, cause the systems to perform one or more of the methods described herein. Moreover, the processor can be configured for performing or otherwise controlling steps, calculations, analysis, and any other functions associated with the methods described herein.

In some embodiments, the storage device can store one or more databases used to store data collected by the systems as well as data used to direct and/or adjust components of the systems. In one embodiment, for example, a database is an HTML file designed by the assignee of the present disclosure. In other embodiments, however, data is stored in other types of databases or data files.

One of ordinary skill in the art will understand that various components of the systems (e.g., the computing device) can be further divided into subcomponents, or that various components and functions of the systems may be combined and integrated. In addition, these components can communicate via wired and/or wireless communication, as well as by information contained in the storage media.

C. Examples

Several aspects of the present technology are set forth in the following examples. Although several aspects of the present technology are set forth in examples directed to systems and methods, these aspects of the present technology can similarly be set forth in examples directed to methods and systems, respectively, in other embodiments. Additionally, these aspects of the present technology may be set forth in examples directed to devices and/or (e.g., non-transitory) computer-readable media in other embodiments.

1. An imaging system, comprising:
a camera; and
a lens arrangement operably connected to the camera, wherein the lens arrangement includes a macro lens removably connected to an eyepiece, and wherein the macro lens is positioned between the camera and the eyepiece.

2. The imaging system of example 1 wherein the eyepiece is positioned in the lens arrangement such that an afocal side of the eyepiece is directed away from the macro lens.

3. The imaging system of example 1 or example 2 wherein the eyepiece is positioned at or near a distalmost end of the lens arrangement and/or of the imaging system such that an entrance pupil of the imaging system is not buried in the lens arrangement.

4. The imaging system of any of examples 1-3 wherein the eyepiece is positioned such that an exit pupil of the eyepiece is an entrance pupil of the imaging system.

5. The imaging system of any of examples 1-4 wherein the lens arrangement has a folded configuration.

6. The imaging system of any of examples 1-5 wherein the lens arrangement further comprises a mirror.

7. The imaging system of any of examples 1-6 wherein:
the lens arrangement further comprises a baffle operably connecting the eyepiece to the macro lens;
the baffle is removably connected to the macro lens and/or to an eyepiece mount housing the eyepiece; and
the baffle is configured to shield an interior of the lens arrangement from stray light not introduced into the interior of the lens arrangement via the eyepiece.

8. The imaging system of any of examples 1-7 wherein the macro lens is electronically and/or automatically focusable.

9. The imaging system of any of examples 1-8 wherein a length of the lens arrangement remains unchanged while (i) the macro lens is removably connected to the eyepiece and (ii) the macro lens is focused.

10. The imaging system of any of examples 1-9 wherein a position of the eyepiece remains unchanged while (i) the macro lens is removably connected to the eyepiece and (ii) the macro lens is focused.

11. The imaging system of any of examples 1-10, further comprising an aperture positioned in front of the eyepiece on a side of the eyepiece opposite the macro lens.

12. The imaging system of example 11 wherein a dimension of the aperture is mechanically or electronically adjustable.

13. The imaging system of any of examples 1-12, further comprising a teleconverter positioned between the camera and the macro lens.

14. The imaging system of any of examples 1-13 wherein the imaging system is configured to capture spatial images of a DUT.

15. The imaging system of any of examples 1-13 wherein the imaging system is configured to capture non-spatial images of a DUT.

16. The imaging system of example 15 wherein the imaging system is configured as a conoscope such that the imaging system measures angular properties of light emitted, reflected, or scattered by or from the DUT.

17. A method of operating an imaging system, the method comprising:

collecting, using an eyepiece of the imaging system, light emitted from and/or reflected off a device under test (DUT);

forming, using the eyepiece, an intermediate image from the collected light, wherein forming the intermediate image includes forming the intermediate image at a location within a focal range of a macro lens of the imaging system;

focusing, using the macro lens, light of the intermediate image onto an image sensor of the imaging system; and capturing, using the image sensor, a measurement of the DUT by capturing the light of the intermediate image.

18. The method of example 17 wherein focusing the light using the macro lens includes electronically and/or automatically focusing the macro lens on the intermediate image (i) without changing a length of the imaging system and/or (ii) without changing a position of the eyepiece.

19. The method of example 17 or example 18, further comprising redirecting the light collected by the eyepiece using a mirror of the imaging system.

20. The method of any of examples 17-19, further comprising positioning an exit pupil of the eyepiece at a first location in front of the DUT corresponding to a location a human eye pupil would be positioned should the DUT and/or a device including the DUT be used by a human as intended.

21. The method of any of examples 17-20, further comprising positioning the imaging system in front of the DUT, wherein positioning the imaging system includes positioning only components corresponding to a small dimension of the imaging system in front of the DUT, and wherein the components corresponding to the small dimension include the eyepiece and/or do not include the macro lens and the image sensor.

22. The method of any of examples 17-21 wherein the measurement of the DUT is a measurement of a spatial characteristic of the DUT or of light emitted, reflected, or scattered by or from the DUT.

23. The method of any of examples 17-21 wherein the measurement of the DUT is a measurement of a non-spatial characteristic of the DUT or of light emitted, reflected, or scattered by or from the DUT.

24. The method of example 23 wherein the non-spatial characteristic includes an angular distribution of the light emitted, reflected, or scattered by or from the DUT.

25. A system, comprising:

a first imaging system including a first camera and a first lens arrangement, wherein the first lens arrangement includes a macro lens removably connected to an eyepiece, and wherein the macro lens is positioned between the first camera and the eyepiece; and a second imaging system including a second camera and a second lens arrangement, wherein the first lens arrangement or the second lens arrangement include a folded configuration.

26. The system of example 25 wherein:

wherein the eyepiece is positioned in the first lens arrangement such that an afocal side of the eyepiece is directed away from the macro lens; and/or wherein the macro lens is electronically and/or automatically focusable.

27. The system of example 25 or example 26 wherein the first imaging system and the second imaging system are arranged side-by-side, and wherein the first imaging system and the second imaging system are positioned in a same orientation.

28. The system of any of examples 25-27 wherein:

the first imaging system and the second imaging system are arranged side-by-side; and the first imaging system is positioned in a first orientation and the second imaging system is positioned in a second, different orientation.

29. The system of any of examples 25-28 wherein the first imaging system and the second imaging system are configured to take simultaneous measurements of one or more devices under test (DUTs).

30. The system of any of examples 25-29 wherein the first imaging system, the second imaging system, or both the first and second imaging systems are configured to capture spatial images of a DUT.

31. The system of any of examples 25-29 wherein the first imaging system, the second imaging system, or both the first and second imaging systems are configured to capture non-spatial images of a DUT.

32. The system of example 31 wherein the first imaging system, the second imaging system, or both the first and second imaging systems are configured as a conoscope to measure angular properties of light emitted, reflected, or scattered by or from the DUT.

33. A method of providing an imaging system, the method comprising:

providing a camera having an image sensor;

providing a lens arrangement, wherein providing the lens arrangement includes (i) providing a macro lens and an eyepiece and (ii) removably connecting the macro lens to the eyepiece; and removably connecting the lens arrangement and to the camera such that the macro lens is positioned between the image sensor and the eyepiece.

34. The method of example 33 wherein:

providing the lens arrangement further includes positioning the eyepiece at or near a distalmost end of the lens arrangement such that (i) an exit pupil of the eyepiece is an entrance pupil of the imaging system and (ii) the entrance pupil of the imaging system is not buried within the lens arrangement; and removably connecting the macro lens to the eyepiece includes removably connecting the macro lens to the eyepiece such that an afocal side of the eyepiece is directed away from the macro lens.

35. The method of example 33 or example 34 wherein providing the macro lens includes providing a macro lens that is electronically and/or automatically focusable.

36. The method of any of examples 33-35 wherein providing the lens arrangement further includes:

providing a baffle; and removably connecting the baffle to (i) the macro lens and (ii) to an eyepiece mount housing the eyepiece such that the baffle is positioned between the macro lens and the eyepiece.

37. The method of any of examples 33-36 wherein:

the image sensor is a first image sensor, the macro lens is a first macro lens, and the eyepiece is a first eyepiece;

the method further comprises modifying optical parameters of the imaging system, wherein modifying the optical parameters includes:

disconnecting (a) the first image sensor from the camera, (b) the lens arrangement from the camera, and/or (c) the first macro lens from the first eyepiece, removably connecting (i) a second image sensor to the camera and/or (ii) a second macro lens to the first eyepiece or the first macro lens to a second eyepiece, and removably connecting (i) the second macro lens and the first eyepiece to the camera or (ii) the first macro lens and the second eyepiece to the camera; and the second image sensor, the second macro lens, and/or the second eyepiece have different optical parameters from the first image sensor, the first macro lens, and/or the first eyepiece, respectively.

38. The method of any of examples 33-37, further comprising calibrating the imaging system to measure spatial characteristics of a DUT or of light emitted, reflected, or scattered by or from the DUT.

39. The method of any of examples 33-37, further comprising calibrating the imaging system to measure non-spatial characteristics of a DUT or of light emitted, reflected, or scattered by or from the DUT.

40. The method of example 39 wherein calibrating the imaging system includes calibrating the imaging system such that the imaging system is a conoscope configured to measure an angular distribution of the light emitted, reflected, or scattered by or from the DUT.

D. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls.

Where the context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on."

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An imaging system for measuring a device under test (DUT), the imaging system comprising:

a camera; and a lens arrangement operably connected to the camera, wherein the lens arrangement includes a macro lens removably connected to an eyepiece, wherein the eyepiece is an ocular lens that is repositionable with respect to the DUT, and wherein the macro lens is positioned between the camera and the eyepiece, wherein the lens arrangement is transitionable to a folded configuration, and wherein the lens arrangement further comprises a baffle operably connecting the eyepiece to the macro lens, and wherein— the baffle is removably connected to the macro lens and/or to an eyepiece mount housing the eyepiece; and the baffle is configured to shield an interior of the lens arrangement from stray light not introduced into the interior of the lens arrangement via the eyepiece.

2. The imaging system of claim 1 wherein the eyepiece is positioned in the lens arrangement such that an afocal side of the eyepiece is directed away from the macro lens.

3. The imaging system of claim 1 wherein the eyepiece is positioned at or near a distalmost end of the lens arrangement and/or of the imaging system such that an entrance pupil of the imaging system is not buried in the lens arrangement.

4. The imaging system of claim 1 wherein the eyepiece is positioned such that an exit pupil of the eyepiece is an entrance pupil of the imaging system.

5. The imaging system of claim 1 wherein the lens arrangement further comprises a mirror.

6. The imaging system of claim 1 wherein the macro lens is electronically and/or automatically focusable.

7. The imaging system of claim 1 wherein a length of the lens arrangement remains unchanged while (i) the macro lens is removably connected to the eyepiece and (ii) the macro lens is focused.

8. The imaging system of claim 1 wherein a position of the eyepiece remains unchanged while (i) the macro lens is removably connected to the eyepiece and (ii) the macro lens is focused.

9. The imaging system of claim 1, further comprising an aperture positioned in front of the eyepiece on a side of the eyepiece opposite the macro lens.

10. The imaging system of claim 9 wherein a dimension of the aperture is mechanically or electronically adjustable.

11. The imaging system of claim 1, further comprising a teleconverter positioned between the camera and the macro lens.

12. The imaging system of claim 1 wherein the imaging system is configured to capture spatial images of the DUT.

13. The imaging system of claim 1 wherein the imaging system is configured to capture non-spatial images of the DUT.

14. The imaging system of claim 13 wherein the imaging system is configured as a conoscope such that the imaging system measures angular properties of light emitted, reflected, or scattered by or from the DUT.

15. A system, comprising:

a first imaging system including a first camera and a first lens arrangement, wherein the first lens arrangement includes a macro lens removably connected to an eyepiece, and wherein the macro lens is positioned between the first camera and the eyepiece; and a second imaging system including a second camera and a second lens arrangement, wherein at least one of the first lens arrangement or the second lens arrangement has a folded configuration, wherein the first lens arrangement further comprises a baffle operably connecting the eyepiece to the macro lens, and wherein— the baffle is removably connected to the macro lens and/or to an eyepiece mount housing the eyepiece; and the baffle is configured to shield an interior of the first lens arrangement from stray light not introduced into the interior of the first lens arrangement via the eyepiece.

16. The system of claim 15 wherein:

the eyepiece is positioned in the first lens arrangement such that an afocal side of the eyepiece is directed away from the macro lens; and/or the macro lens is electronically and/or automatically focusable.

17. The system of claim 15 wherein the first imaging system and the second imaging system are arranged side-by-side, and wherein the first imaging system and the second imaging system are positioned in a same orientation.

18. The system of claim 15 wherein:

the first imaging system and the second imaging system are arranged side-by-side; and the first imaging system is positioned in a first orientation and the second imaging system is positioned in a second, different orientation.

19. The system of claim 15 wherein the first imaging system and the second imaging system are configured to take simultaneous measurements of one or more devices under test (DUTs).

20. The system of claim 15 wherein the first imaging system, the second imaging system, or both the first and second imaging systems are configured to capture spatial images of a device under test (DUT).

21. The system of claim 15 wherein the first imaging system, the second imaging system, or both the first and second imaging systems are configured to capture non-spatial images of a DUT.

22. The system of claim 21 wherein the first imaging system, the second imaging system, or both the first and second imaging systems are configured as a conoscope to measure angular properties of light emitted, reflected, or scattered by or from the DUT.

* * * * *